(12) United States Patent
Agranat

(10) Patent No.: US 7,715,714 B2
(45) Date of Patent: May 11, 2010

(54) LASER POWER GRID

(75) Inventor: Aharon J. Agranat, Mevasseret Zion (IL)

(73) Assignee: Yissum Research Development Company of the Hebrew University of Jerusalem, Ltd., Jerusalem (IL)

( * ) Notice: Subject to any disclaimer, the term of this patent is extended or adjusted under 35 U.S.C. 154(b) by 1097 days.

(21) Appl. No.: 10/542,923

(22) PCT Filed: Jan. 29, 2004

(86) PCT No.: PCT/IL2004/000091

§ 371 (c)(1),
(2), (4) Date: Jul. 21, 2005

(87) PCT Pub. No.: WO2004/070978

PCT Pub. Date: Aug. 19, 2004

(65) Prior Publication Data

US 2006/0062514 A1    Mar. 23, 2006

Related U.S. Application Data

(60) Provisional application No. 60/443,174, filed on Jan. 29, 2003.

(51) Int. Cl.
*H04B 10/20* (2006.01)
*H04J 14/00* (2006.01)

(52) U.S. Cl. ...................................... 398/58
(58) Field of Classification Search ............... 398/66, 398/171
See application file for complete search history.

(56) References Cited

U.S. PATENT DOCUMENTS

| 5,864,414 A | * | 1/1999 | Barnsley et al. ............... 398/71 |
| 5,923,449 A | * | 7/1999 | Doerr et al. .................... 398/7 |
| 5,999,291 A | * | 12/1999 | Anderson .................... 398/91 |
| 6,141,126 A |   | 10/2000 | Lahat et al. |
| 6,411,418 B1 |   | 6/2002 | Deri et al. |

(Continued)

FOREIGN PATENT DOCUMENTS

WO        WO 00/02098        1/2000

OTHER PUBLICATIONS

B. Pesach et al., "Free-Space Optical Cross-Connect Switch by Use of Electroholograpy", Applied Optics, vol. 39, No. 5, Feb. 10, 2000.*

(Continued)

*Primary Examiner*—Shi K Li
(74) *Attorney, Agent, or Firm*—Browdy and Neimark, PLLC

(57) ABSTRACT

A laser power grid for operation with data networks employs WDM and incorporates wavelength addressing. The laser power grid (100) includes a laser power supply station (110) comprising a plurality of continuous-work laser sources (112, 114, 115, 116, 118), a laser distribution grid (130) for distributing light propagations of different wavelengths throughout a data network and an optical switching network (142, 144, 145, 146, 148) coupled to the laser distribution grid for locally turning the laser power on when it is needed. The laser power grid replaces systems of tunable lasers. It is considerably faster and cheaper than systems of tunable lasers and produces less waste heat within the data network surroundings. The laser power grid incorporates parallel fast optical communication in complex multi-node communication and computer networks and enables the implementation of burst switching and packet switching by wavelength addressing.

41 Claims, 14 Drawing Sheets

U.S. PATENT DOCUMENTS

| | | | |
|---|---|---|---|
| 6,501,866 B2* | 12/2002 | Thomas | 385/1 |
| 6,782,210 B1* | 8/2004 | Okada et al. | 398/161 |
| 2002/0085594 A1 | 7/2002 | Pezeshki et al. | |
| 2002/0159688 A1 | 10/2002 | Kim et al. | |
| 2004/0208540 A1* | 10/2004 | Nakajima et al. | 398/45 |

OTHER PUBLICATIONS

S. Yamazaki et al., "A Coherent Optical FDM CATV Distribution System", Journal of Lightwave Technology, vol. 8, No. 3, Mar. 1990.*

Rubin et al. "Implementation of Ultrafast Widely-Tunable Burst-Mode 10 Gbit/s Transceiver", Electronics Letter,38(23): 1462-1463, 2002.

Agranat "Optical Lambda-Switching at Telecom Wavelengths Base on Electroholography", Infrared Holography for Optical Communications, Topics Appl. Phys. 88:129-156, 2003.

Balberg et al. "Electric-Field Multiplexing of Volume Holograms in Paraelectric Crystals", Applied Optics, 37(5): 841-847,1998.

* cited by examiner

10 Processing Element
20 Transmitter
30 Processing Unit
40 Tunable Laser
50 Data Packet 59 Received Data
60 Modulator
90 Wavelength Addressed Receiver
E Electronic Data to be Transmitted
λ Wavelength Designation

| 100 Laser Power Grid | 140 Optical Switching Network |
| 110 Laser Power Supply | 132, 134, 135, 136, 138 Optical Fibers |
| 112, 114, 115, 116, 118 Laser Sources | 142, 144, 145, 146, 148 Optical Switch Arrays |
| 130 Laser Distribution Grid | λ Wavelength Designation |

120 Optical Switch Array
121 Optical Wavelength Demultiplexer
122, 124, 125, 126, 128 Optical Switches
123 Coupler
130 Optical Fiber
142 Optical Switch Array
λ Wavelength Designation

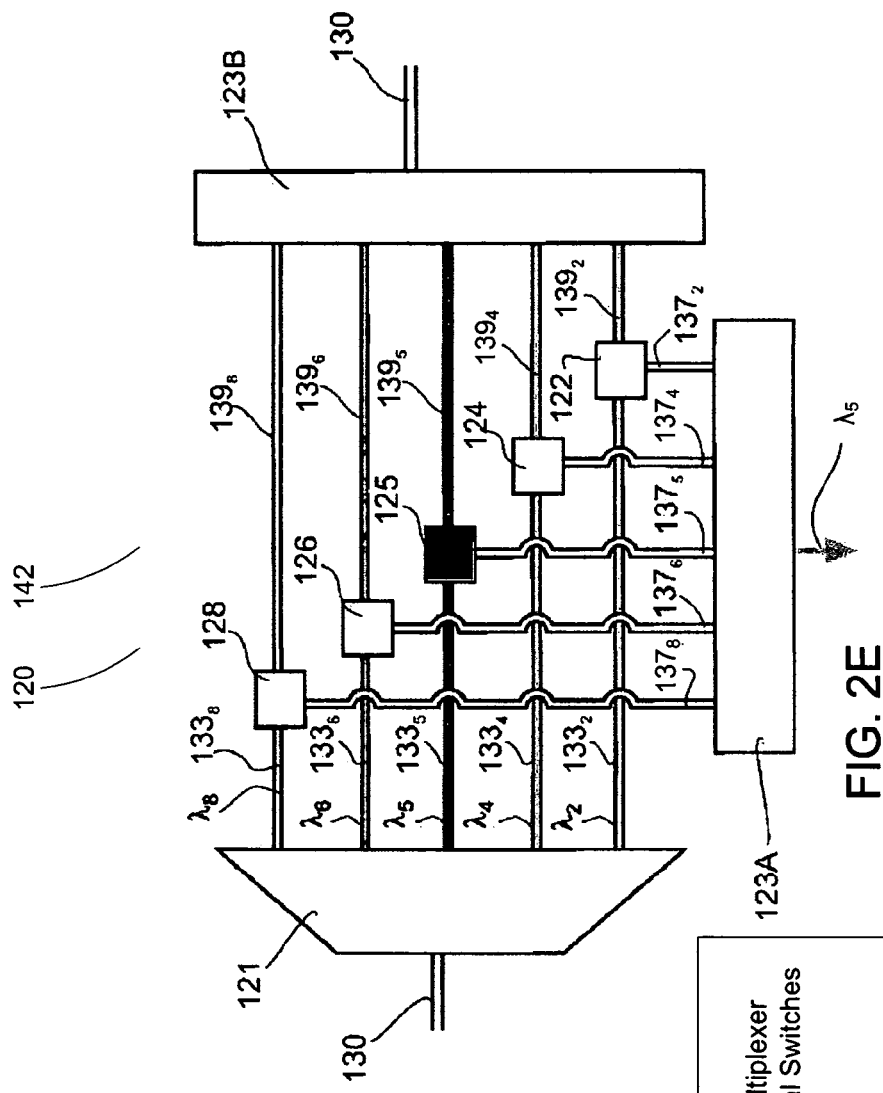

110 Laser Power Supply Station
112, 114, 115, 116, 118 Continuous Work (CW) Laser Sources
127 Electrohalographic Switch
130 Optical Fiber
131 Optical Coupler
142, 144, 145, 146, 148 Optical Switches
160 Variable Electric Source
λ Wavelength Designation

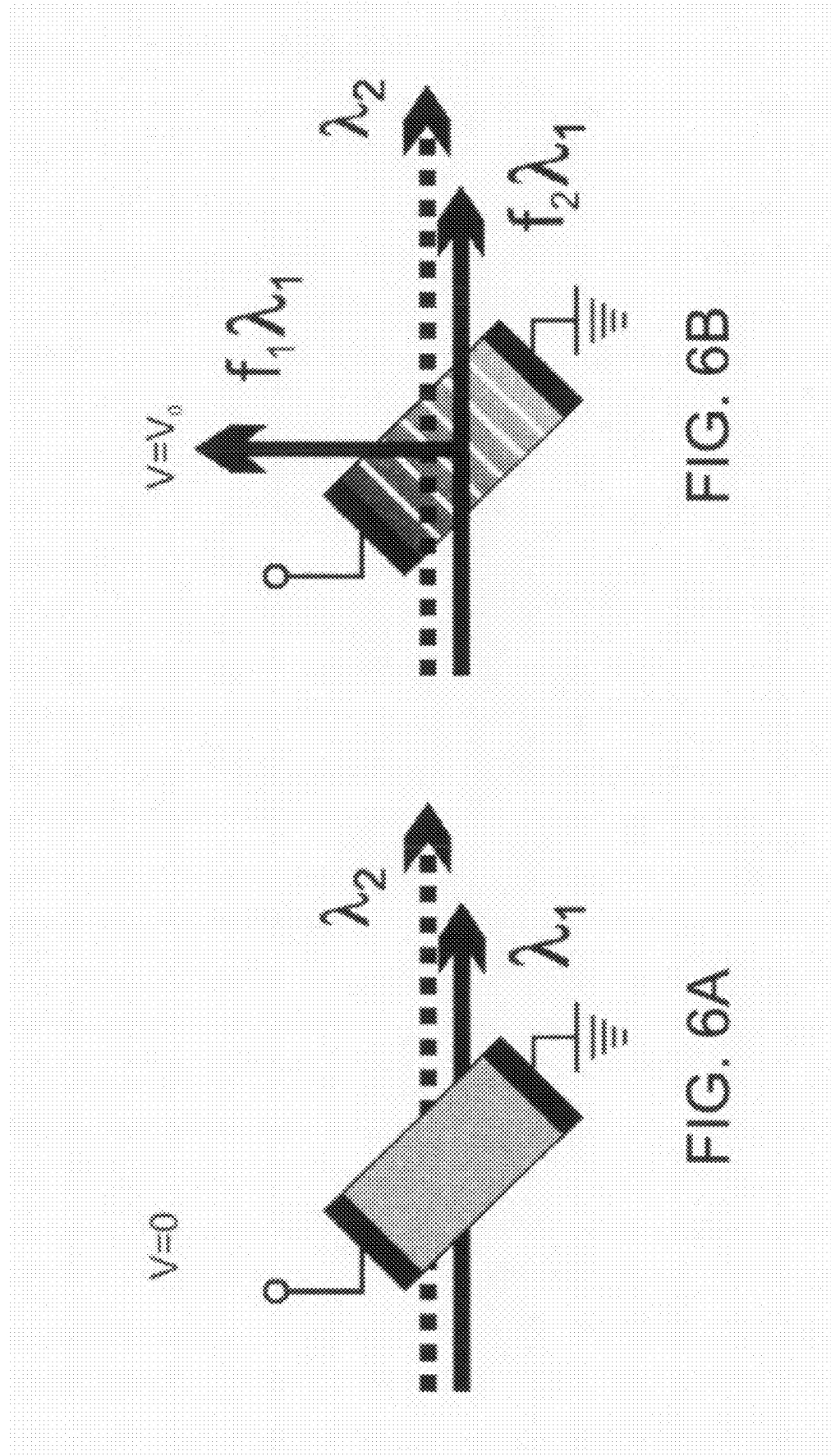

LASER POWER GRID

RELATED PATENT APPLICATION

This application is a National Phase Application of PCT/IL2004/000091 having International Filing Date of 29 Jan. 2004, which claims the benefit of U.S. Provisional Patent Application No. 60/443,174 filed 29 Jan. 2003. The contents of the above Application are all incorporated herein by reference.

FIELD AND BACKGROUND OF THE INVENTION

The present invention relates to data networks, employing WDM multiplexing, and incorporating wavelength addressing, and in particular, to a laser power grid, for operation with these networks.

Communication traffic is steadily increasing, both in size and in complexity. Leading service providers for Internet Protocol (IP), for example, report a 300 percent growth per year in Internet traffic, while traditional voice traffic has grown at a about 13 percent. [Cisco documentation, of Sep. 28 05:50:55 PDT 2002, www.cisco.com/univercd/cc/td/doc/product/mels/cm1500/dwdm/dwdm_fns.htm]. In response to this explosive growth in bandwidth demand, long-haul service providers are moving away from Time division multiplexing (TDM) based systems, which were optimized for voice but now prove to be inefficient, to wavelength division multiplexing (WDM).

TDM was invented as a way of maximizing the amount of voice traffic over a medium by multiplexing, so that more than one telephone call could be put on a single link. In essence, TDM increases the capacity of a transmission link by slicing time into smaller intervals, so that the bits from multiple input sources can be carried on the link, thus, increasing the number of bits transmitted per second.

Using TDM, data may be transmitted at 10 Gbps and recent advances have resulted in speeds of 40 Gbps. Yet, the electronic circuitry that makes this possible is complex and costly. Furthermore, technical issues, such as chromatic dispersion and nonlinear effects that can affect waveform quality, may restrict the applicability of TDM at these rates.

An alternative to TDM, wavelength division multiplexing (WDM) now reigns as the leading technologies for transmitting high volume of data traffic over long distances. It is based on the inherent advantage of photons as data carriers, which is that photons of different wavelengths do not normally interact, thus enabling the transmission of many channels of data, in parallel, in a single fiber, with photons of a different wavelengths acting as channels. WDM uses single-mode fiber to carry multiple light waves of differing frequencies.

In a sense, multiplexing by WDM is analogous to radio broadcasting on different wavelengths. Each channel is transmitted at a different frequency, and one can select a frequency, as if by using a tuner.

Thus, in WDM, many wavelengths are combined onto a single fiber, so as to simultaneously multiplex signals of 2.5 to 40 Gbps each over a strand of fiber. In this manner, the effective capacity of existing fiber infrastructure can be increased by a factor of up to 100.

When using WDM, each of the wavelengths is launched into the fiber, at the transmitting end, and the signals are demultiplexed by an optical wavelength demultiplexer, at the receiving end. As with TDM, the resulting capacity is an aggregate of the input signals. But an important difference between TDM and WDM is that WDM carries each input signal independently of the others. In other words, each wavelength channel has its own dedicated bandwidth; all signals arrive independently, rather than being broken up and carried in time slots.

Dense wavelength division multiplexing (DWDM) is different form WDM mainly in degree. DWDM spaces the wavelengths more closely than WDM; in consequence, it has a greater overall capacity. DWDM systems with 100 channels per fiber each carrying 10 Gb/sec are commercially available, enabling data traffic at a rate of approximately 1 Terabit per second in a single fiber. The spacing limit is not precisely known yet, and has probably not been reached. The state of art of commercial systems is 50 GHz.

Similarly, coarse wavelength division multiplexing (CWDM) relates to spacing the wavelengths sparsely, thus reducing the cost of the systems.

The capability of two optical signals of different wavelengths to occupy the same fiber, at the same time, makes WDM point-to-point segments extraordinarily powerful. The challenge is how to harness this capability to supply the huge bandwidth that flows in high performance computing systems that are predominantly a complex mesh of parallel interconnections. In particular it is desirable to combine the inherent advantages of the packet/burst-switching paradigm with the vast data transfer capability of the optical fiber.

An added feature when using WDM is the possibility of using the channel wavelength as an address vehicle for delivering the transmissions to their destinations. This idea is termed wavelength addressing.

Wavelength addressing relates to assigning every processing element (PE), or node, in a data network a wavelength, as a receiving address. The processing element, or node, may be a chip, a board, a cabinet, or even a routing switch. A schematic illustration of a PE adapted for wavelength addressing is provided in FIG. 1A.

As seen in FIG. 1A, a PE 10 includes a processing unit 30, a transmitter 20 and a wavelength addressed receiver 90[$\lambda_0$]. Processing unit 30 communicates to transmitter 20 an information defined by $E_i$; $\lambda_i$, wherein $E_i$ relates to an electronic data to be transmitted, and $\lambda_i$ is the address of the receiving PE, at a specific instant. It will be appreciated that the information defined by $E_i$; $\lambda_i$ relates to a specific transmittal. A moment later, processing unit 30 may communicate to transmitter 20 an information defined by $E_n$; $\lambda_n$.

Transmitter 20 communicates the wavelength designation $\lambda_i$ to a tunable laser 40 which produces a light propagation of wavelength $\lambda_i$. Additionally, transmitter 20 communicates the electronic data $E_i$ to a modulator 60, which modulates the light propagation of wavelength $\lambda_i$ so as to produce a data packet 50$_i$;$\lambda_i$ containing electronic information $E_i$ and addressed to a PE whose receiving address is $\lambda_i$.

When information is received, wavelength addressed receiver 90[$\lambda_0$] communicates the received data, for example, 59$_n$;$\lambda_0$ to processing unit 30.

FIG. 1B illustrates a data network 150 having a plurality of PEs of the type described in FIG. 1A, denoted, PE 12, PE 14, PE 15, PE 16, and PE 18, having processing units 32, 34, 35, 36, and 38, respectively, transmitters 22, 24, 25, 26, and 28, respectively, tunable lasers, 42, 44, 45, 46, and 48, respectively, modulators 62, 64, 65, 66, and 68, respectively, and wavelength addressed receivers 92[$\lambda_5$], 94[$\lambda_6$], 95[$\lambda_4$], 96[$\lambda_8$], and 98[$\lambda_2$], respectively, the wavelength addressed receivers communicating their received data to processing units 32, 34, 35, 36, and 38, respectively.

Accordingly, a plurality of data packets, $52_i$; $\lambda_2$, $54_i$; $\lambda_4$, $55_i$; $\lambda_5$, $56_i$; $\lambda_6$, and $58_i$; $\lambda_8$, each issuing from its respective PE, are coupled to an optical coupler 70 and transmitted, by WDM.

An optical-wavelength demultiplexer 80 decouples the data packets by wavelengths, and each is routed to its wavelength address.

It will be appreciated that by coupling the data packets to a single fiber, each PE needs to communicate only with optical coupler 70 and optical-wavelength demultiplexer 80, rather than with all the other PEs.

Additionally, the use of wavelength addressing reduces the electronic information that needs to be contained in the data packet.

The architecture of FIGS. 1A and 1B relies heavily on the performance and price of the tunable lasers; in fact, a major incentive for the development of tunable lasers is their application for wavelength multiplexing and addressing. Yet, tunable lasers are expensive, cumbersome, and slow, and their use limits scalability.

Rubin et al., (S. Rubin, E., Buimovich, G. Ingber and D. Sadot, "Implementation of an Ultra-Fast Widely-Tunable Burst-Mode 10 Gbps Transceiver," Electronic Letters vol. 38 No. 23 pp. 1462-1463, November 2002) describe a tunable 10 Gbps transceiver, for optical burst-switching applications. The burst-mode receiver has fast tuning of less then 50 nanoseconds between 80 channels over the entire C-band, together with fast locking, of less than 100 nanosecond.

Faster tunable lasers are under development; however, their projected performance and price may not justify their deployment in computer networks with multitude of nodes, in particular for board-to-board and chip-to-chip communication.

As a consequence, the range of applications implemented by tunable lasers is limited to networks in which the price of each node is high, and the length of the burst is comparatively long.

There is thus a widely recognized need for, and it would be highly advantageous to have WDM systems which implement wavelength addressing, devoid of the above limitations.

SUMMARY OF THE INVENTION

In accordance with one aspect of the present invention, there is provided a laser power grid, comprising:

a first plurality of continuous-work (cw) laser sources, for generating a first plurality of light propagations, each light propagation being distinct by its wavelength;

a laser distribution grid, formed as at least one optical fiber, optically coupled to the first plurality of laser sources, for transmitting the first plurality of light propagations; and a second plurality of optical-switch arrays, each array comprising at least one optical switch, coupled to the laser distribution grid, and adapted for deflecting a single one of the light propagations of a distinct wavelength, responsive to an input signal.

In accordance with an additional aspect of the present invention, the laser distribution grid is formed as a plurality of optical fibers.

In accordance with an additional aspect of the present invention, the laser distribution grid is formed as a multi-mode fiber.

Alternatively, the laser distribution grid is formed as a single-mode fiber.

In accordance with an additional aspect of the present invention, the at least one optical switch is an electroholographic switch.

In accordance with an additional aspect of the present invention, the at least one optical switch is operative by electric field multiplexing (EFM).

Alternatively, the optical-switch array includes a plurality of optical switches, equal to the first plurality of light propagations, each optical switch being optically coupled to the laser distribution grid, and each optical switch being adapted for deflecting a single one of the light propagations of the distinct wavelength, responsive to the input signal.

In accordance with an additional aspect of the present invention, the a laser distribution grid is formed as one optical fiber, which is coupled to the first plurality of optical switches, with an optical wavelength demultiplexer upstream of the optical-switch array and an optical coupler downstream of the optical-switch array.

In accordance with an additional aspect of the present invention, the laser power grid comprises an optical coupler for coupling optical fibers along the deflected course of the light propagation.

In accordance with an additional aspect of the present invention, the each optical switch is adapted to deflect a predetermined portion of the single light propagation of the distinct wavelength.

In accordance with an additional aspect of the present invention, the laser sources are fixed-wavelength laser sources.

Alternatively, the laser sources are tunable laser sources.

In accordance with another aspect of the present invention, there is provided a data network, comprising:

a laser power grid, which comprises:

a first plurality of continuous-work (cw) laser sources, for generating a first plurality of light propagations, each light propagation being distinct by its wavelength;

a laser distribution grid, formed as at least one optical fiber, optically coupled to the first plurality of laser sources, for transmitting the first plurality of light propagations; and a second plurality of optical-switch arrays, each array comprising at least one optical switch, coupled to the laser distribution grid, and adapted for deflecting a single one of the light propagations of a distinct wavelength, responsive to an input signal;

a second plurality of Processing elements (PEs), each electronically coupled to one of the second plurality of optical-switch arrays, for providing the input signal, for deflecting the single light propagation of the distinct wavelength; and a second plurality of optical modulators, each electronically coupled to one of the second plurality of PEs and optically coupled to the one of the optical-switch arrays, associated with the PE, for modulating the single light propagation of the distinct wavelength, responsive to an electronic information of the PE, for forming an optical data packet of a distinct wavelength for transmission, associated with the PE.

Additionally, the data network is adapted for single-wavelength data transmission.

Alternatively, the network is adapted for wavelength division multiplexing (WDM), and comprises an optical coupler, for receiving data packets from the modulators and for coupling the data packets to an optical fiber.

Additionally, the WDM is a coarse wavelength division multiplexing (CWDM).

Alternatively, the WDM is a dense wavelength division multiplexing (DWDM).

In accordance with an additional aspect of the present invention, the data network comprises a demultiplexer, optically coupled to the optical fiber for decoupling the data packets, in accordance with their wavelengths.

In accordance with an additional aspect of the present invention, the data network comprises wavelength addressing, wherein each of the optical data packets is routed to a receiving PE, as determined by the distinct wavelength of the optical data packet.

In accordance with an additional aspect of the present invention, any one of the second plurality of PEs may be assigned a wavelength address and may act as the receiving PE.

In accordance with an additional aspect of the present invention, the second plurality is less than or equal to the first plurality, and each of the second plurality of PEs is assigned a wavelength address.

In accordance with an additional aspect of the present invention, the second plurality of PEs is arranged in a U plurality clusters, for a multi-cluster design, the data network comprises:

a second plurality of routing switches, each electronically coupled to one of the second plurality of PEs, for receiving an input signal therefrom, and each optically coupled to an output of one of the second plurality of optical modulators, for routing data packets issuing from the optical modulators to a $U^2$ plurality of output optical couplers, responsive to the input signals from the PEs; each of the $U^2$ plurality of output optical couplers being designated by an output cluster and an input cluster, and a U plurality of input optical couplers, for coupling data packets arriving in the $U^2$ plurality of output optical couplers to a U plurality of optical fibers, each designated by an input cluster.

In accordance with an additional aspect of the present invention, the data network comprises a U plurality of demultiplexers, each optically coupled to one of the U plurality of optical fibers, for decoupling the data packets, in accordance with their wavelengths.

In accordance with an additional aspect of the present invention, the second plurality is less than or equal to the first plurality times the U, and each of the second plurality of PEs is assigned an address by wavelength and cluster.

In accordance with an additional aspect of the present invention, the U plurality of clusters is distributed among different locations.

In accordance with an additional aspect of the present invention, the second plurality of PEs is distributed among a Q plurality of locations, the data network comprises:

a Q plurality of output optical couplers for coupling a plurality of data packets to be transmitted from each location to a Q plurality of output optical fibers;

an overall optical coupler, for coupling the Q plurality of output optical fibers to a single, overall fiber;

a demultiplexer, optically coupled to the single, overall fiber, for decoupling the data packets, in accordance with their wavelengths.

In accordance with an additional aspect of the present invention, the data network comprises a Q plurality of input optical couplers, for coupling a plurality of data packets heading to the Q plurality of locations, into a Q plurality of input optical fibers, each leading to one location, the coupling being based on wavelength addresses of PEs in each location.

In accordance with an additional aspect of the present invention, the data network comprises a Q plurality of input demultiplexers, each optically coupled to one of the input optical fibers, for decoupling the data packets, in accordance with their wavelengths.

In accordance with an additional aspect of the present invention, the laser distribution grid is formed as a plurality of optical fibers.

In accordance with an additional aspect of the present invention, the laser distribution grid is formed as a multi-mode fiber.

Alternatively, the laser distribution grid is formed as a single-mode fiber.

In accordance with an additional aspect of the present invention, the at least one optical switch is an electroholographic switch.

In accordance with an additional aspect of the present invention, the at least one optical switch is operative by electric field multiplexing (EFM).

Alternatively, the optical-switch array includes a plurality of optical switches, equal to the first plurality of light propagations, each optical switch being optically coupled to the laser distribution grid, and each optical switch being adapted for deflecting a single one of the light propagations of the distinct wavelength, responsive to the input signal.

In accordance with an additional aspect of the present invention, the a laser distribution grid is formed as one optical fiber, which is coupled to the first plurality of optical switches, with an optical wavelength demultiplexer upstream of the optical-switch array and an optical coupler downstream of the optical-switch array.

In accordance with an additional aspect of the present invention, the data network comprises an optical coupler for coupling optical fibers along the deflected course of the light propagation.

In accordance with an additional aspect of the present invention, the each optical switch is adapted to deflect a predetermined portion of the single light propagation of the distinct wavelength.

In accordance with an additional aspect of the present invention, the laser sources are fixed-wavelength laser sources.

Alternatively, the laser sources are tunable laser sources.

In accordance with another aspect of the present invention, there is provided a method of WDM transmission, incorporating wavelength addressing between a plurality of PEs, distributed among Q locations, comprising:

at each location, coupling a plurality of data packets issuing from the location to a Q plurality of output optical fibers, each leading to a central location;

at the central location, coupling data packets arriving in the Q plurality of output optical fibers to a central optical fiber;

at the central location, optically demultiplexing, by wavelength, data packets issuing from the central optical fiber;

at the central location, coupling data packets which have been optically demultiplexed, by wavelength, to a Q plurality of input optical fibers, each leading to one of the Q locations, the coupling being based on wavelength addressing; and at each locations, optically demultiplexing, by wavelength, data packets issuing from the input optical fibers, in accordance with their wavelengths.

In accordance with another aspect of the present invention, there is provided a method of WDM transmission, incorporating wavelength addressing between a plurality of PEs, in a multi-cluster data network, of U clusters, comprising:

at each cluster, routing a plurality of data packets issuing from the cluster to a $U^2$ plurality of output optical couplers, each output optical coupler being designated by two variables: output an input clusters;

coupling the plurality of data packets routed to each coupler to a $U^2$ plurality of output optical fibers, associated with the $U^2$ plurality of optical couplers, each output optical fiber being designated by the two variables: output an input clusters;

coupling data packets arriving in the $U^2$ plurality of output optical fibers to a U plurality of input optical fibers, the coupling being done by wavelength addressing, each input optical fiber being designated by an input cluster, and each leading to the cluster of its designation;

at each cluster, optically demultiplexing, by wavelength, data packets issuing from the input optical fibers, in accordance with their wavelengths.

In accordance with another aspect of the present invention, there is provided a method of data transmitting, comprising:

providing a laser power grid, which comprises:

a first plurality of continuous-work (cw) laser sources, for generating a first plurality of light propagations, each light propagation being distinct by its wavelength;

a laser distribution grid, formed as at least one optical fiber, optically coupled to the first plurality of laser sources, for transmitting the first plurality of light propagations; and a second plurality of optical-switch arrays, each array comprising at least one optical switch, coupled to the laser distribution grid, and adapted for deflecting a single one of the light propagations of a distinct wavelength, responsive to an input signal;

electronically coupling a second plurality of PEs to the second plurality of optical-switch arrays, each PE being adapted to provide the input signal, for deflecting the single light propagation of the distinct wavelength, associated with the each PE; and modulating the single light propagation of the distinct wavelength, responsive to an electronic information of the each PE, for forming an optical data packet of a distinct wavelength for transmission, associated with the each PE.

In accordance with another aspect of the present invention, there is provided a laser power grid, comprising:

a first plurality of continuous-work (cw) laser sources, for generating a first plurality of light propagations, each light propagation being distinct by its wavelength;

a laser distribution grid, formed as at least one optical fiber, optically coupled to the first plurality of laser sources, for transmitting the first plurality of light propagations; and a second plurality of optical-switch arrays, each array comprising at least one optical switch, coupled to the laser distribution grid, and each array being adapted for deflecting a plurality of light propagations, responsive to an input signal.

The present invention relates to a laser power grid, for operation with data networks, employing WDM multiplexing, and incorporating wavelength addressing. The laser power grid includes a laser power supply station, comprising a plurality of continuous-work laser sources; a laser distribution grid, formed as an optical fiber, or as a plurality of optical fibers, for distributing light propagations of different wavelengths throughout a data network, to supply it with laser power; and an optical switching network, coupled to the laser distribution grid, for turning the laser power on, locally, where it is needed. The laser power grid replaces systems of tunable lasers in known data networks; it is considerably faster and cheaper than systems of tunable lasers and produces less waste heat within the data network surroundings. The laser power grid incorporates parallel fast optical communication in complex multi-node communication and computer networks and enables the implementation of burst switching and packet switching by wavelength addressing. It is particularly cost effective as the routing paradigm in inter-chip, inter-board, and inter-cabinet applications, as well as between distant sites, in a wide spectrum of applications, in both the telecom and datacom arenas.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2A-2H schematically illustrate a laser power grid, in accordance with the present invention;

FIGS. 6A and 6B schematically illustrate an electroholographic switch, in accordance with the present invention.

DESCRIPTION OF THE PREFERRED EMBODIMENTS

Figure 1A:
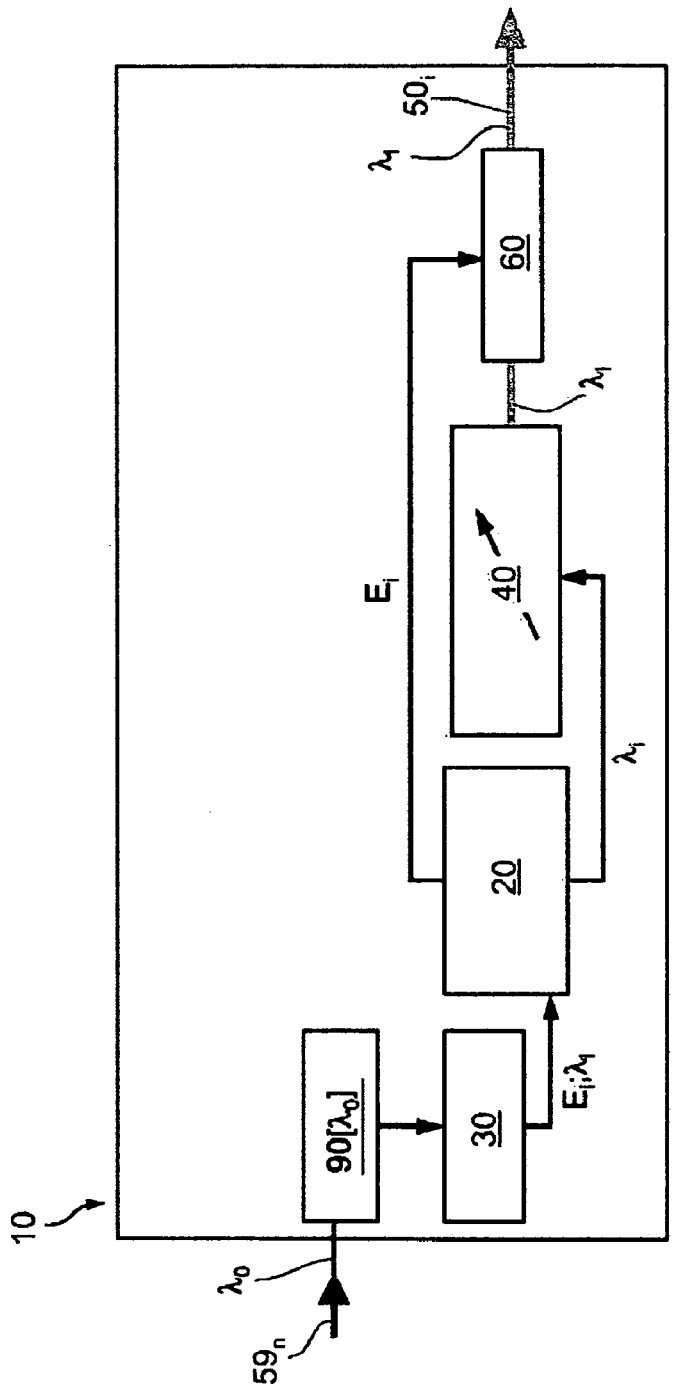
FIGS. 1A and 1B schematically illustrates a data network, employing WDM multiplexing, and incorporating wavelength addressing, using tunable lasers, as known in the art.

The present invention is of a laser power grid, for operation with data networks, employing wDM multiplexing, and incorporating wavelength addressing. Specifically, the laser power grid includes a laser power supply station, comprising a plurality of continuous-work laser sources; a laser distribution grid, formed as an optical fiber, or as a plurality of optical fibers, for distributing light propagations of different wavelengths throughout a data network, to supply it with laser power; and an optical switching network, coupled to the laser distribution grid, for turning the laser power on, locally, where it is needed. The laser power grid replaces systems of tunable lasers in known data networks; it is considerably faster and cheaper than systems of tunable lasers and produces less waste heat within the data network surroundings. The laser power grid incorporates parallel fast optical communication in complex multi-node communication and computer networks and enables the implementation of burst switching and packet switching by wavelength addressing. It is particularly cost effective as the routing paradigm in inter-chip, inter-board, and inter-cabinet applications, as well as between distant sites, in a wide spectrum of applications, in both the telecom and datacom arenas.

The principles and operation of the laser power grid, according to the present invention, may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 2A-2H schematically illustrate a laser power grid 100, in accordance with the present invention.

Preferably, laser power grid 100 is operable with data networks, which employ WDM multiplexing, preferably also incorporating wavelength addressing, thus eliminating the need for a tunable laser to be associated with each processing element (PE).

Laser power grid 100 includes a laser power supply station 110, which includes a plurality M of continuous-work (cw) laser sources, 112, 114, 115, 116, and 118, each producing a light propagation of a specific wavelength $\lambda_2$, $\lambda_4$, $\lambda_5$, $\lambda_6$, and $\lambda_8$, respectively.

Preferably, laser sources 112, 114, 115, 116, and 118 are fixed wavelength laser sources. Alternatively, they may be tunable lasers.

Figure 2A:
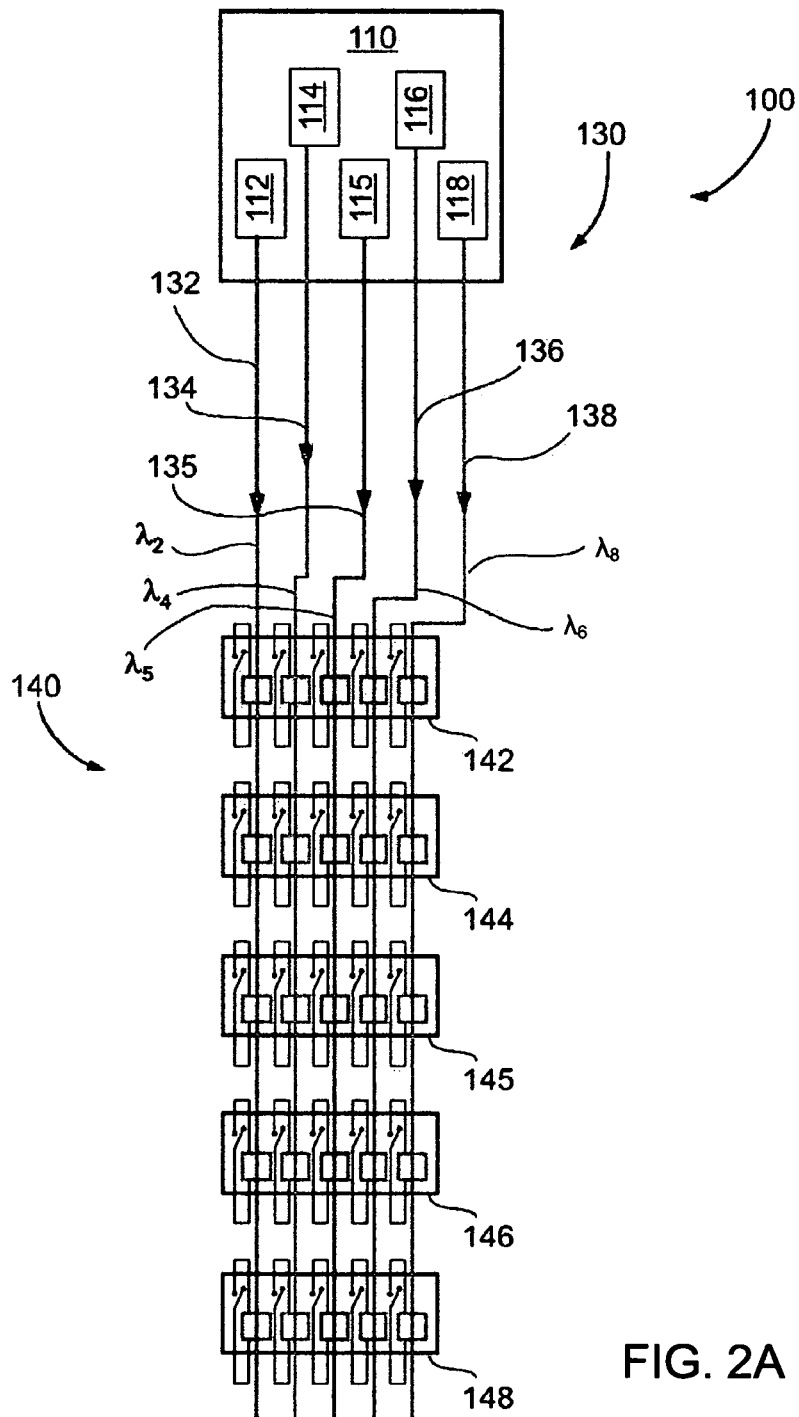
Figure 2B:
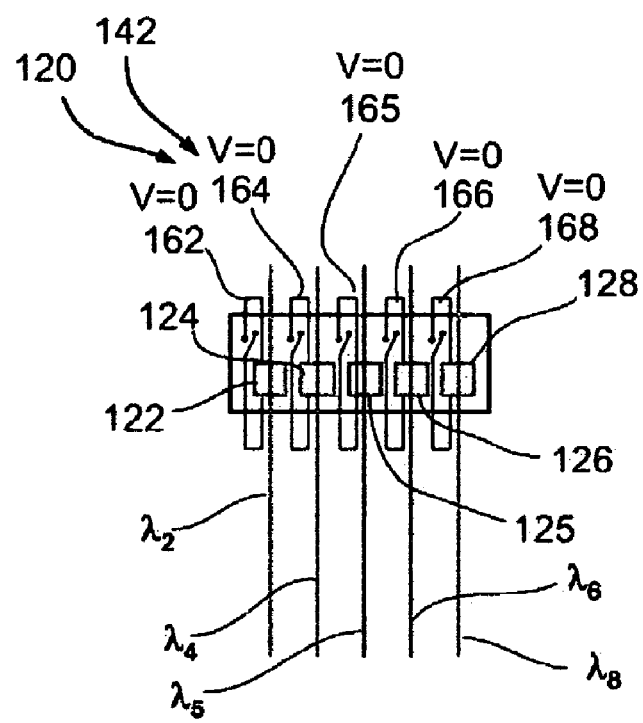
Figure 2C:
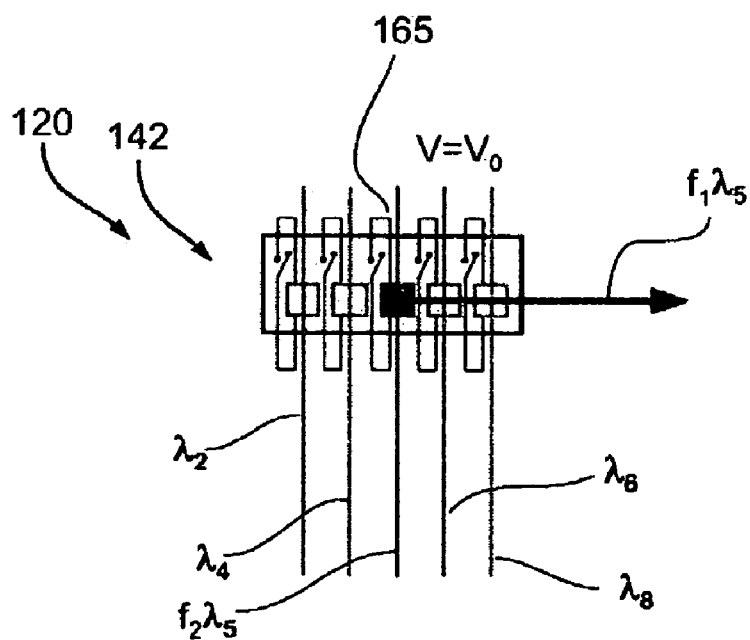

Additionally, laser power grid 100 includes a laser distribution grid 130, which issues from laser power supply station 110, preferably, as a single optical fiber 130 (FIGS. 2D-2G), for distributing light propagations of wavelengths $\lambda_2$, $\lambda_4$, $\lambda_5$, $\lambda_6$, and $\lambda_8$, respectively, to a data network, to supply it with laser power. Alternatively, as seen in FIGS. 2A-2C, a plurality of optical fibers 132, 134, 135, 136, and 138 may be used. The single optical fiber or the plurality of optical fibers may be single-mode or multimode fibers.

Furthermore, laser power grid 100 includes an optical switching network 140, coupled to laser distribution grid 130, for turning the laser power on, locally, where it is needed.

Optical switching network 140 includes a plurality N of optical-switch arrays, 142, 144, 145, 146, and 148, each serving a PE, or node. Thus the number of optical-switch arrays should equal the number of PEs in the data network.

Additionally, as seen in FIGS. 2B-2E, each optical-switch array, such as optical-switch array 142, or an example optical-switch array 120, may include a plurality M of optical switches, 122, 124, 125, 126, and 128, M being the number of light propagations which are distributed by laser power grid 100. The optical switches are coupled to laser distribution grid 130.

Several geometries may be employed for coupling laser distribution grid 130 to optical switch array 120, comprising optical switches, 122, 124, 125, 126, and 128.

FIGS. 2A-2C illustrate a situation in which laser distribution grid 130 includes optical fibers 132, 134, 135, 136, 138, each transmitting a single light propagation, and each coupled to a single optical switch, the switch being adapted to deflect the light propagation carried by the optical fiber. Thus, optical fibers 132, 134, 135, 136, and 138 are coupled to optical switches 122, 124, 125, 126, and 128 respectively, for deflecting light propagations of wavelengths $\lambda_2$, $\lambda_4$, $\lambda_5$, $\lambda_6$, and $\lambda_8$, respectively, responsive to input signals.

As FIGS. 2A-2C illustrate, electric switches 162, 164, 165, 166, and 168 provide individual control to optical switches 122, 124, 125, 126, and 128, respectively. At a certain moment, array 120 may respond to an input signal to optical switch 125, deflecting the light propagation of wavelength $\lambda_5$, as seen in FIG. 2C. At another moment, array 120 may respond to an input signal to optical switch 128, deflecting the light propagation of wavelength $\lambda_8$.

As will be described hereinbelow, in conjunction with FIGS. 6A and 6B, only a portion $f_1$ of the light propagation may be deflected, while a second portion $f_2$ may continue to power the data network.

Preferably, optical switches, 122, 124, 125, 126, and 128 are electroholographic switches.

Figure 2D:
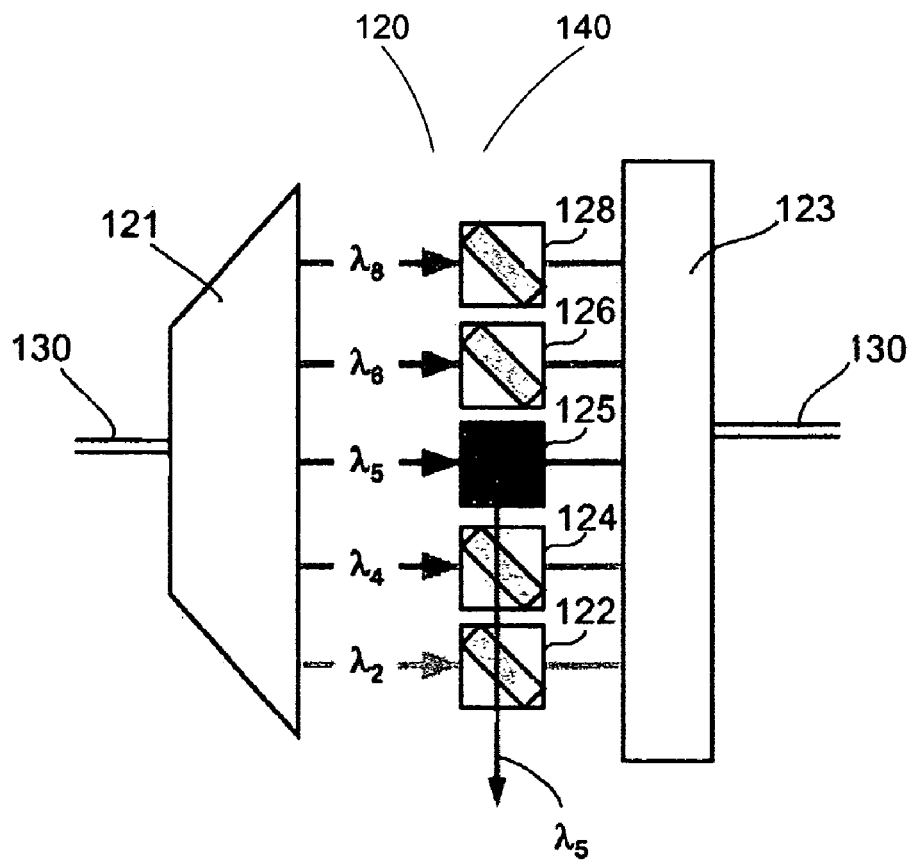

FIG. 2D schematically illustrates a preferred geometry for coupling laser distribution grid 130 to optical switch array 120, comprising optical switches, 122, 124, 125, 126, and 128, wherein laser distribution grid 130 is arranged in a single optical fiber and optical switches 122, 124, 125, 126, and 128 are electroholographic switches.

Upstream of optical switch array 120, an optical wavelength demultiplexer decouples the light propagations of optical fiber 130 to individual wavelengths, and each light propagation is routed to the electroholographic switch of the corresponding wavelength. Preferably the holograms are latent, activated by the application of an electric field. As seen in FIG. 2D, electroholographic switch 125 is activated, deflecting the light propagation of wavelength $\lambda_5$ to the PE associated with the optical switch array.

The other light propagations continue undeleted to a coupler 123, for coupling to optical fiber 130.

It will be appreciated that although the deflected light propagation of wavelength $\lambda_5$ may pass through other electroholographic switches on its deflected course, for example, electroholographic switches 124 and 122 as seen in FIG. 2D, these do not affect it, as they are adapted for other wavelengths.

FIG. 2E schematically illustrates another geometry for coupling laser distribution grid 130 to optical switch array 120, comprising optical switches, 122, 124, 125, 126, and 128, wherein laser distribution grid 130 is arranged in a single optical fiber, wherein optical switches 122, 124, 125, 126, and 128 are analog optical switches.

The essential difference between the present embodiment and that of FIG. 2D, is that in accordance with the present embodiment, the deflected light propagation course does not pass through optical switches.

Thus, each optical switch is operative as a 1×2 switch, having a single input optical fiber $133_i$ (where i designates the light propagation) and two outputs optical fibers, $137_i$ for the deflected course, and $139_i$ for the undeflected course. Both sets of optical fibers, $137_i$ and $139_i$ are directed to optical couplers. An optical coupler 123B couples the undeflected light propagations to optical fiber 130, which continues to power the data network. An optical coupler 123B couples between the plurality of optical fibers, $137_i$ such as optical fibers $137_2$, $137_4$, $137_5$, $137_6$, and $137_8$ and the PE associated with optical switch array 120.

In accordance with a preferred embodiment of the present invention, optical switches, 122, 124, 125, 126, and 128 are as taught by U.S. Pat. No. 6,542,264, to Agranat, et al., dated Apr. 1, 2003, whose disclosure is incorporated herein by reference. U.S. Pat. No. 6,542,264 teaches an optical switch, comprising a paraelectric photorefractive material, in which a latent hologram is stored. The reconstruction, or activation of the hologram is controllable by the application of an externally applied electric field, so that in the absence of an external electric field, light propagations, which impinge on the material, do not sense the hologram. The application of an electric field causes the hologram to be reconstructed, and light propagations, which meet Bragg's condition, are diffracted.

The reconstructed hologram is formed by spatial modulation of the refractive index of the paraelectric photorefractive material, which arises from the quadratic electro-optic effect induced by the combined action of a spatially modulated space charge within the paraelectric photorefractive material and a single externally applied electric field. Alternatively, the reconstructed hologram may be formed by spatial modulation of the refractive index arising from a quadratic electro-optic effect induced by the combined action of a spatially modulated low frequency dielectric constant and a single externally applied electric field.

It will be appreciated that other optical and electroholographic switches may similarly be used.

In accordance with the present invention, the optical switches may be electroholographic switches as taught by any one of the following references whose disclosure is incorporated herein by reference: 1. A. J. Agranat, "Optical Lambda-Switching at Telecom Wavelengths Based on Electroholography", in: IR Holography for Optical Communications—Techniques, Materials and Devices, Pierpaolo Boffi, Davide Piccinin, Maria Chiara Ubaldi (Eds.), (Springer Verlag series on Topics in Applied Physics 2002); and 2. M. Balberg, M. Razvag, E. Refaelli, and A. J. Agranat, "Electric field multiplexing of volume holograms in paraelectric crystals" Applied Optics 37, pp. 841-847 (1998).

Figure 2F:
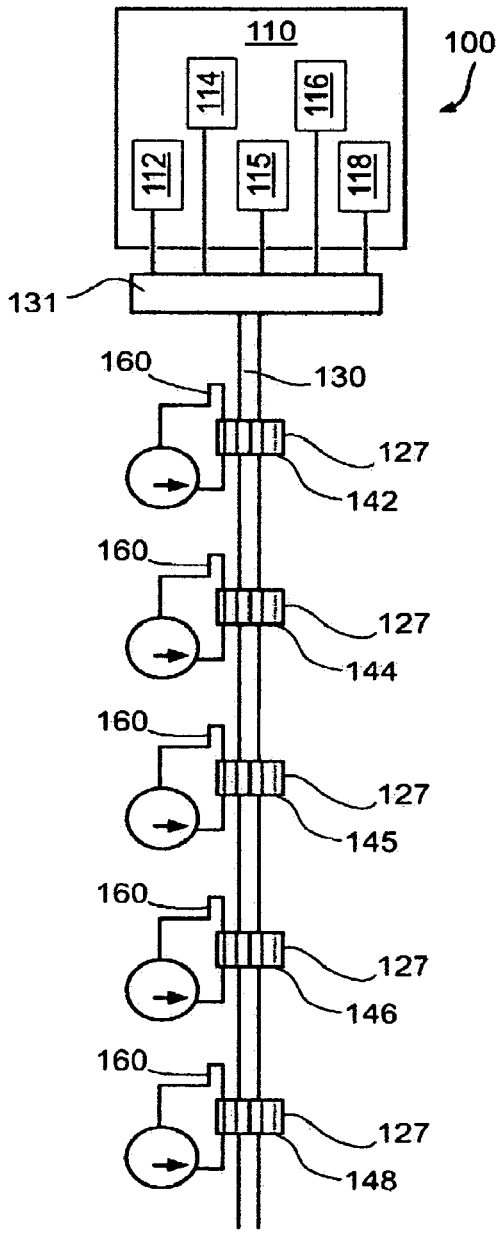
Figure 2G:
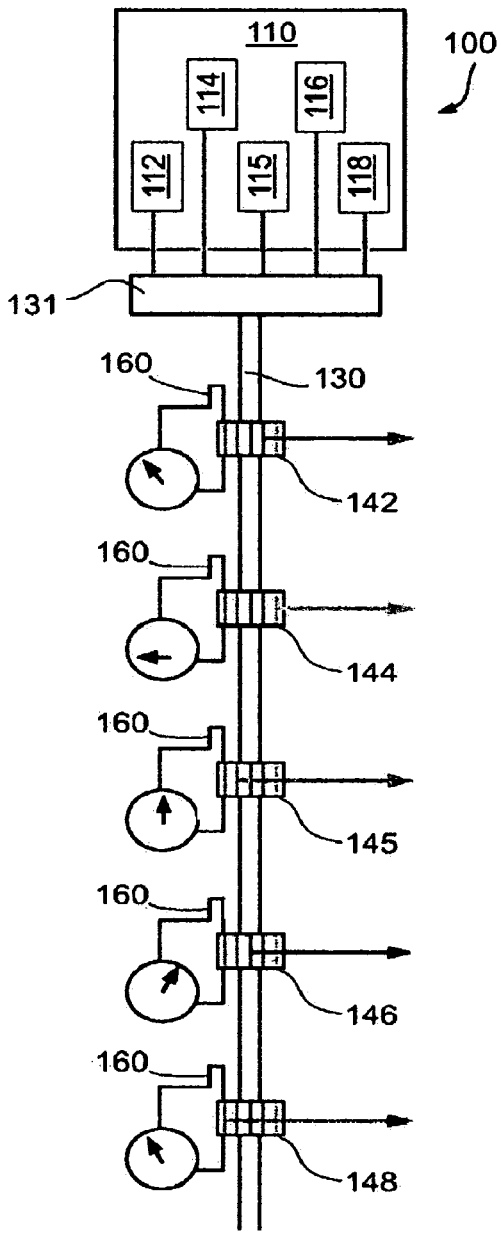

Referring further to the drawings, FIGS. 2F and 2G schematically illustrate another geometry, using a single electroholographic switch 127, in place of array of optical switches 120 of FIGS. 2B-2C and 2D-2E. Single electroholographic switch 127 contains a plurality of holograms, adapted to deflect different light propagations at different electric fields. A variable electric source 160 is associated with single electroholographic switch 127, for applying a different electric field, each time, responsive to an input signal from the PE associated with single electroholographic switch 127. This method is known as electric field multiplexing (EFM).

Single electroholographic switch 127 may operate by Bragg's detuning, for example as taught in U.S. Pat. No. 5,684,612 to Wilde et al., dated Nov. 4, 1997; and M. Balberg, M. Razvag, E. Refaelli, and A. J. Agranat, "Electric field multiplexing of volume holograms in paraelectric crystals" Applied Optics 37, pp. 841-847 (1998), both of whose disclosures are incorporated herein by reference.

Preferably, the response time for the optical switches is in the order of 1-10 nanoseconds.

Figure 2H:
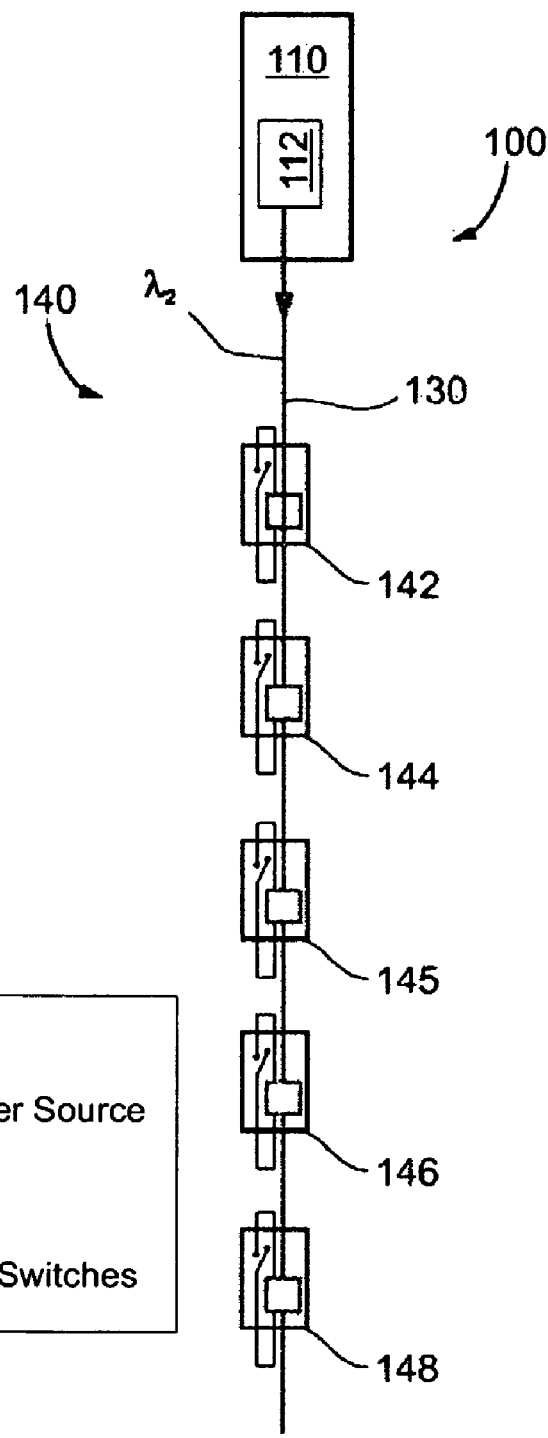

Referring further to the drawings, FIG. 2H schematically illustrates laser power grid 100 of a single wavelength, for example, for use with data networks transmitting at a single wavelength.

Figure 3A:
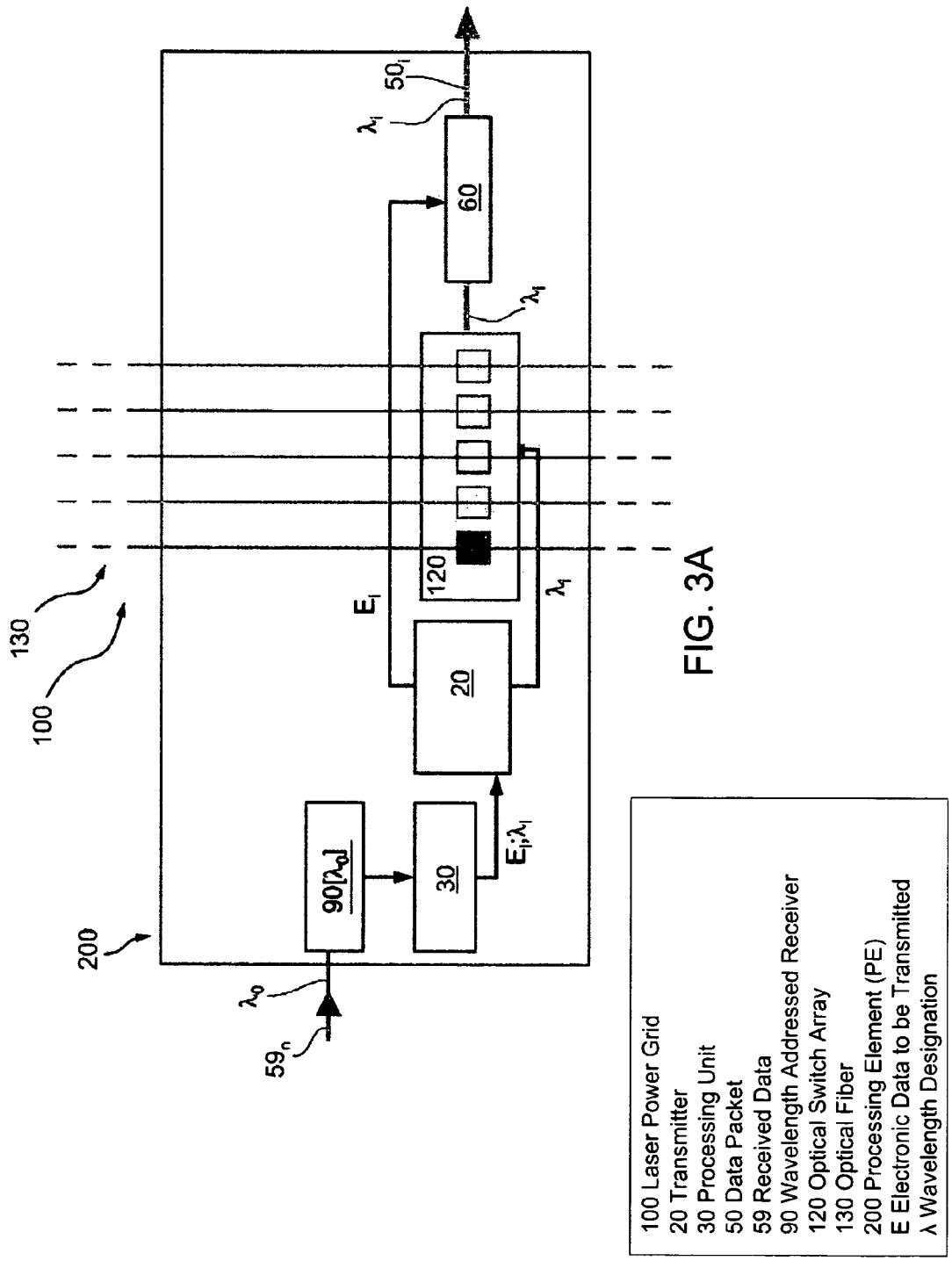
FIGS. 3A and 3B schematically illustrates a data network, employing WDM multiplexing, and incorporating wavelength addressing, using a laser power grid, in accordance with a preferred embodiment of the present invention.
Figure 3B:
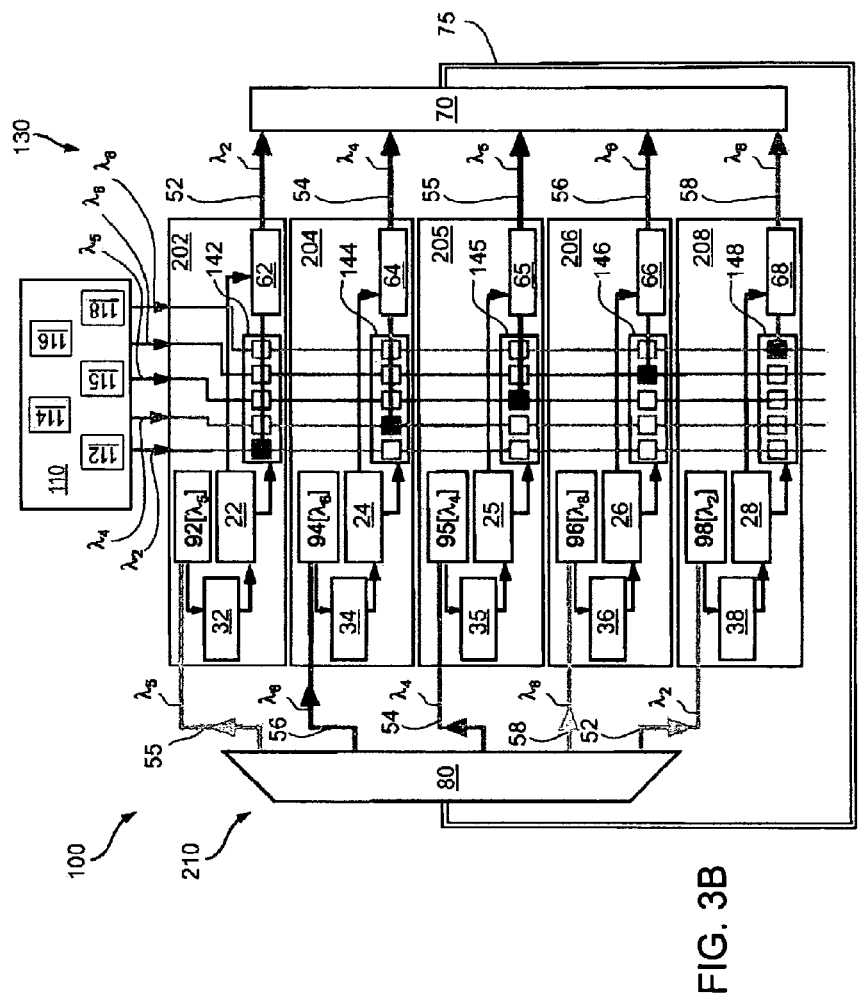

Referring further to the drawings, FIGS. 3A and 3B schematically illustrate a processing element (PE) 200 and a data network 210 employing WDM multiplexing, and preferably also incorporating wavelength addressing, using laser power grid 100, in accordance with the present invention.

It will be appreciated that the PE may a chip, a board, a cabinet, or even a routing switch.

In essence, laser power grid 100 and data network 210 of the present invention replace tunable laser 40 of the prior art, as can be seen by comparing PE 10 (FIG. 1A) of the prior art, and PE 200 (FIG. 3A) of the present invention.

Thus, data network 210 (FIG. 3B) is similar in operation to data network 150 of the prior art, but is free from the use of tunable lasers. Instead, one array of fixed wavelength lasers, namely laser power supply station 110, powers the whole network.

As seen in FIG. 3A, PE 200 includes processing unit 30, transmitter 20 and wavelength addressed receiver 90[$\lambda_0$]. Processing unit 30 communicates to transmitter 20 an information defined by $E_i$; $\lambda_j$, wherein $E_i$ relates to an electronic data to be transmitted, and $\lambda_j$ is the address of the receiving PE, at a specific instant.

Transmitter 20 communicates the wavelength designation $\lambda_i$ to optical switch array 120. In response, a light propagation of wavelength $\lambda_i$ is deflected. Additionally, transmitter 20 communicates the electronic data $E_i$ to a modulator 60, which modulates the light propagation of wavelength $\lambda_i$ so as to produce a data packet $50_i$;$\lambda_i$ containing electronic information $E_i$ and addressed to a PE whose receiving address is $\lambda_i$.

When information is received, wavelength addressed receiver 90[$\lambda_0$] communicates the received data, for example, $59_n$;$\lambda_0$, to processing unit 30.

FIG. 3B illustrates data network 210 having a plurality of PEs of the type described in FIG. 3A, denoted, PE 202, PE 204, PE 205, PE 206, and PE 208, having processing units 32, 34, 35, 36, and 38, respectively, transmitters 22, 24, 25, 26, and 28, respectively, optical switch arrays 142, 144, 145, 146, and 148, respectively, modulators 62, 64, 65, 66, and 68, respectively, and wavelength addressed receivers 92[$\lambda_5$], 94[$\lambda_6$], 95[$\lambda_4$], 96[$\lambda_8$], and 98[$\lambda_2$], respectively, the wavelength addressed receivers communicating their received data to processing units 32, 34, 35, 36, and 38, respectively.

Accordingly, a plurality of data packets, $52_i$; $\lambda_2$, $54_i$; $\lambda_4$, $55_i$; $\lambda_5$, $56_i$; $\lambda_6$, and $58_i$; $\lambda_8$, each issuing from its respective PE, are coupled to optical coupler 70 and transmitted, by WDM.

Optical-wavelength demultiplexer 80 decouples the data packets by wavelengths, and each is routed to its wavelength address.

Data network 210 of the present invention is advantageous over data network 150 of the prior art for the following reasons:

i. speed: data network 210 of the present invention is faster—the response time of the optical switches may be 10 nanoseconds or less, compared to about 50 nanoseconds, for the tunable laser ii. waste heat: because laser power supply station 110 is external to the data network, heat production is minimized so less heat needs to be dissipated, within the data network surroundings; and iii. cost: the optical switch arrays are generally cheaper then the tunable lasers.

Figure 4:
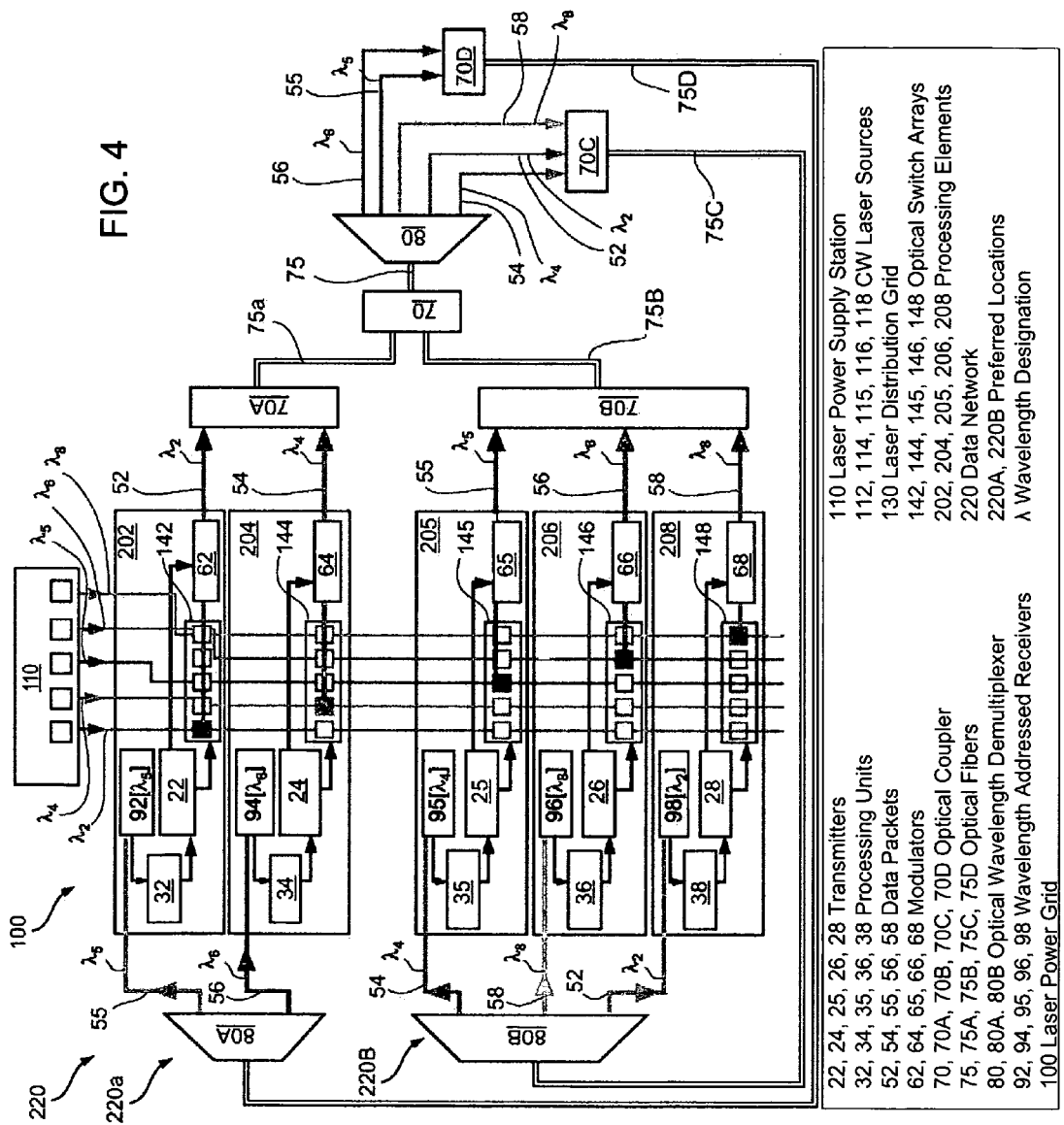
FIG. 4 schematically illustrates a data network, employing WDM multiplexing, and incorporating wavelength addressing, between different locations.

Referring further to the drawings, FIG. 4 schematically illustrates a data network 220, employing WDM multiplexing, and preferably also incorporating wavelength addressing, wherein the PEs are distributed in more than one location.

In accordance with the present example, some PEs are located at a location 220A, and some PEs are located at a location 220B, wherein each PE may communicate with any other PE in both 220A and 220B.

For the present example, the architecture of FIG. 3B is unsuitable, since single optical fiber 75 cannot serve both 220A and 220B. However, the design and operation of individual PEs 202, 204, 205, 206, and 208, as illustrated in FIG. 3A, is not affected by their location.

It will be appreciated however, that when two or more locations are employed, each location may be served by a dedicated laser power grid. Alternatively, when the locations are close to each other, a single laser power grid may be used.

When a data network is spread over several locations, a total of five steps, three steps of coupling and two steps of optical wavelength demultiplexing, are required, as follows:

1. As a first step, data packets issuing from each location, such as locations 220A and 220B, are coupled to single fibers, such as fibers 75A and 75B, respectively, which lead from each location to a central location.
2. As a second step, at the central location, data packets arriving in single fibers from each location, such as single fibers 75A and 75B, are coupled by central optical coupler 70, to central optical fiber 75.
3. As a third step, at the central location, central optical wavelength demultiplexer 80 decouples the data packets in accordance with their wavelengths. These are then routed by wavelength, to the destination, for example, location 220A or 220B.
4. As a fourth step, at the central location, data packets heading to common locations are coupled by destination, to a single fiber for each designation, for example, by couplers 70C and 70D to single fibers 75C and 75D, respectively.
5. As a fifth step, at each destination, optical wavelength demultiplexers, such as demultiplexers 80A and 80B, decouple the data packets, in accordance with their wavelengths.

It will be appreciated that this architecture does not increase in steps as the number of locations increases.

Figure 5A:
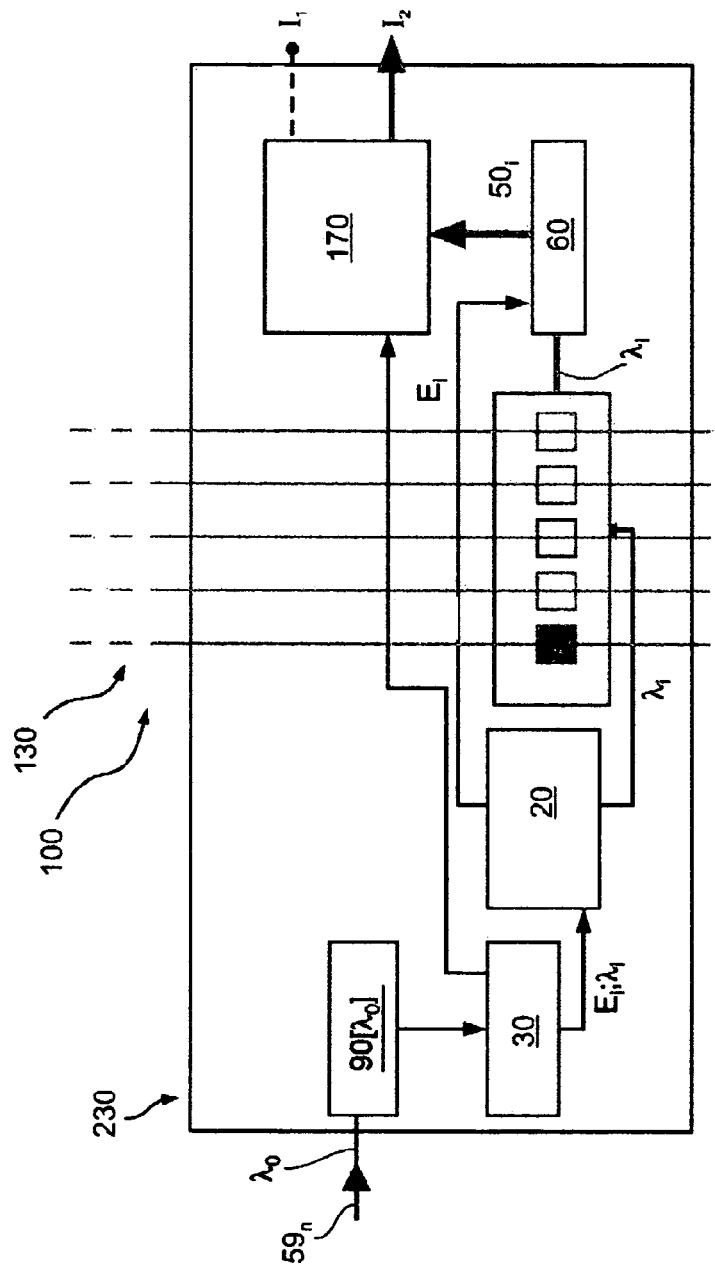
FIGS. 5A and 5B schematically illustrate a multi-cluster data network, employing WDM multiplexing, and incorporating wavelength addressing, using a laser power grid, in accordance with the present invention.
Figure 5B:
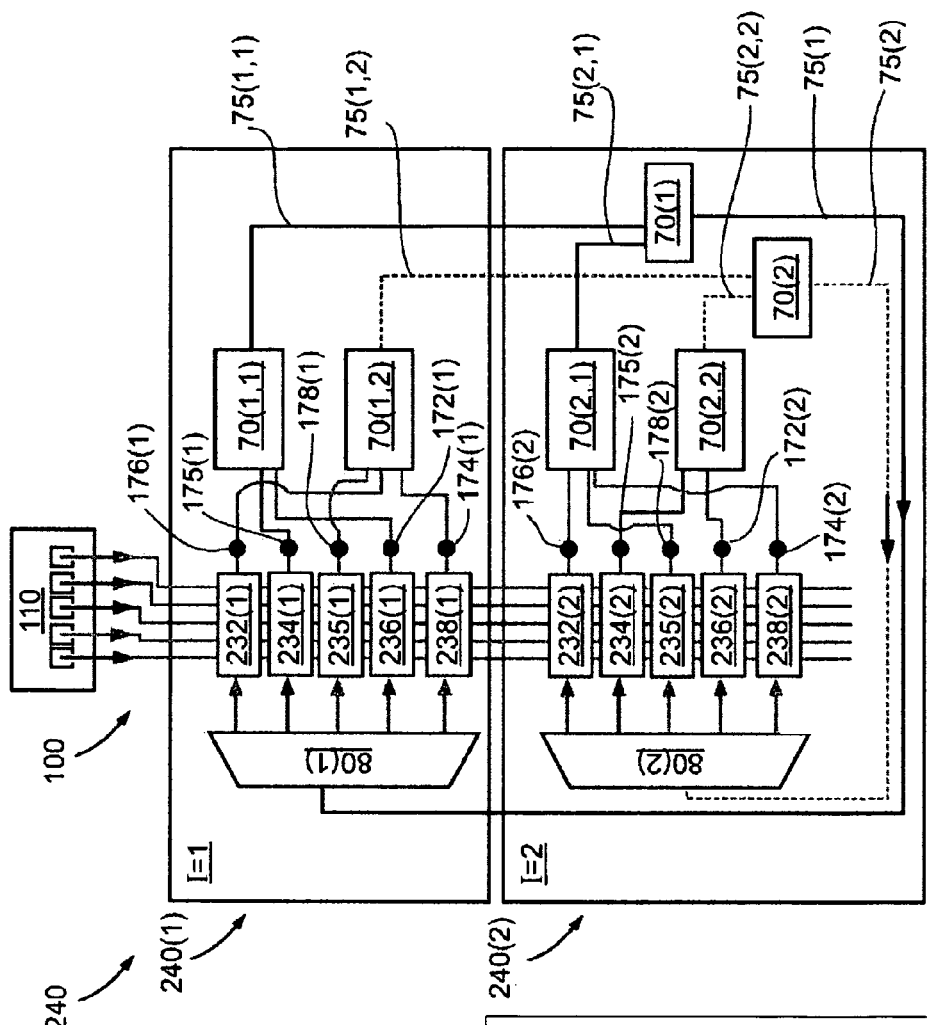

Referring further to the drawings, FIGS. 5A and 5B schematically illustrate a multi-cluster data network, employing WDM multiplexing, and preferably incorporating wavelength addressing, using a laser power grid, in accordance with the present invention.

Multi-clustering provides a means for wavelength addressing even as the number of PEs is greater than the number of wavelengths of laser power grid 100—the data network may be scaled up to a size equal to or less than the number of wavelengths times the number of clusters.

FIG. 5A schematically illustrates a PE 230, wherein processing unit 30 communicates to transmitter 20 an information defined by $E_i;\lambda_i;I_i$, wherein $E_i$ relates to an electronic data to be transmitted, as before (FIGS. 1A and 3A) $\lambda_i$ is the address of the receiving PE, within a specific cluster, and $I_i$ is the destination cluster. In the present example, transmitter 20 designates cluster 2 for the specific data packet defined by $E_i;\lambda_i$.

Multi-clustering requires two steps of coupling and a single step of optical wavelength demultiplexing:

1. As a first step, the data packets from each cluster are coupled by destination cluster, as follows:
   i. all data packets from cluster 1, heading to cluster 1, are coupled, by a coupler 70(1,1), to an optical fiber 75(1,1);
   ii. all data packets from cluster 1, heading to cluster 2, are coupled, by a coupler 70(1,2), to an optical fiber 75(1,2);
   iii. all data packets from cluster 2, heading to cluster 1, are coupled, by a coupler 70(2,1), to an optical fiber 75(2,1); and
   iv. all data packets from cluster 1, heading to cluster 1, are coupled, by a coupler 70(2,2), to an optical fiber 75(2,2).
2. As a second step, the optical fibers leading to a same destination cluster are coupled, as follows:
   i. the two optical fibers leading to cluster 1, namely 75(1,1) and 75(2,1) are coupled to an optical fiber 75(1), by a coupler 70(1); and
   ii. the two optical fibers leading to cluster 2, namely 75(1,2) and 75(2,2) are coupled to an optical fiber 75(2), by a coupler 70(2).
3. As a third step, optical wavelength demultiplexing takes place within each cluster, as follows:
   i. optical wavelength demultiplexer 80(1) demultiplexes data packets arriving by optical fiber 75(1), in accordance with wavelengths; and
   ii. optical wavelength demultiplexer 80(2) demultiplexes data packets arriving by optical fiber 75(2), in accordance with wavelengths.

It will be appreciated that this architecture does not increase in steps as the number of clusters increases.

It will be appreciated that many combinations of the architectures of FIGS. 3A-5B are also possible, depending on the circumstances, and are within the scope of the present invention. For example, clusters may be geographically separated, or adjacent to each other, a single cluster may be split among several geographical location, all the receiving PEs may be in one location, and all the transmitting PEs in another, and many others.

Referring further to the drawings, FIGS. 6B and 6B schematically illustrate an electroholographic switch, in accordance with the present invention.

It may happen that two or more PEs are to transmit at the same wavelength, simultaneously. In order to provide laser power for such occurrences, from laser power grid 100, fractional deflection may be employed.

The electroholographic switch it inherently analog. Hence it is possible to vary the level of the applied voltage, so as to determine the fraction light propagation that is deflected, leaving the remainder to propagate unaffected.

FIGS. 6A and 6B illustrate switch 125, seen also in FIG. 2C, for providing fractional deflection $f_1$ to the light propagation of wavelength $\lambda_5$. The remaining fraction $f_2$ continues to power the network.

This procedure may be employed when the power level of laser power grid 100 is sufficient. Each PE may be adapted to monitor the power of the light propagation at the optical switch associated with it, and deflect only the necessary amount of power. For example, a first PE requiring $\lambda_5$, may deflect ⅓ of the power, allowing the remainder ⅔ to continue down the grid. A second PE may deflect ½ of the remainder. A third PE may take 100% of the remainder. This may be done by adjusting the voltage applied to the optical switch, to vary the diffraction efficiency. In this manner, a single light propagation may be used by three PEs, simultaneously.

DISCUSSION

The fact that the phenomenal capabilities of optical communication are a preferred solution to meet the exponentially demand for bandwidth in computer systems is commonly accepted. In particular, several groups in both the industry and academia are currently considering wavelength addressing based on tunable lasers. The applications that are being considered include packets distribution in routers, communication between boards in servers, burst switching in storage area networks, and inter cabinet parallel communication in high performance computers. The projected timetable for these applications varies between four years (servers and storage area networks), through five years (routers), and eight years (high performance computers). In contrast, the projected development of the laser power grid concept of the present invention, from preliminary feasibility demonstration to design win is expected to be accomplished within three to four years.

The laser power grid, described hereinabove, in conjunction with FIGS. 2A-6, exports a basic, even trivial concept from the electronic arena to the optical arena. In electronic circuits, power lines that carry electrical power, supplied from an external power source, such as a battery or a power supply, distribute the electrical energy necessary to operate the various components that constitute the circuit. The idea at the basis of the laser power grid is to supply the optical energy that is needed to operate a massive optical communication network from a laser sources operative as a power source, and to distribute this energy in the data network by a grid analogous to a power grid.

Thus, by using one set of fixed wavelength lasers the entire network can be operated. This architecture obviates several of the problems that characterize the "tunable lasers architecture" of FIG. 1A. First, one set of fixed lasers serves the entire network rather than a tunable laser for each transmitting port. The lasers are operated in continuous-work cw mode at a single wavelength so that the cumbersome operation of fast random hopping of the tunable laser to a new wavelength for each data packet is avoided. Additionally, the power distribution by means of the electroholographic switching station is fast. Furthermore power dissipation at the cabinet is a major handicap of extending the performance of complex computer systems. An additional advantage of the laser power grid concept is that a substantial fraction of the power is dissipated outside the data network surroundings. Moreover, mean time between failures (MTBF) for the laser power grid is expected to be less than that for tunable lasers.

The concept of the laser power grid appears promising for harnessing optical communication to supply the bandwidth necessary for developing the next generations of computer systems, in particular for board-to-board and chip-to-chip applications. As has been shown, the implementation of the laser power grid concept can be accomplished by different technologies of optical switches.

In addition, the concept of the laser power grid bears general significance for harnessing the strength of optical communication to both telecom and datacom applications. For example in circuit switching applications, concentrating the light source in one location and managing the central offices in a ring by passive electrooptic devices may result in substantial reduction of operation expenses of the ring. Such applications can be deployed on the existing infrastructure employing WDM technology.

Since the laser light propagations in laser power grid 100 (FIG. 2A) carry optical power and not data, multimode fibers may be used, rendering the power loss in coupling and decoupling to the optical switches minimal. It should also be noted that laser power grid 100 can be constructed of a ribbon of fibers, or by a single fiber.

Laser power grid 100 obviates the need for tunable lasers in wavelength addressing schemes and makes wavelength addressing possible even for very fast burst switching in networks with many PEs, including inter-board and inter-chip applications.

It should be emphasized that the switching station 140 (FIGS. 2A-6) need not necessarily be based on the principle of electroholography. However, electroholographic switches seem to be the most cost effective devices for implementing the laser power distribution.

Electroholography is a wavelength selective optical switching method based on governing of the reconstruction process of volume holograms by means of an electric field. A detailed review of electroholography and its application to wavelength selective switching can be found in A. J. Agranat, "Optical Lambda-Switching at Telecom Wavelengths Based on Electroholography", in: IR Holography for Optical Communications—Techniques, Materials and Devices, Pierpaolo Boffi, Davide Piccinin, Maria Chiara Ubaldi (Eds.), (Springer Verlag series on Topics in Applied Physics 2002).

Figure 1B:
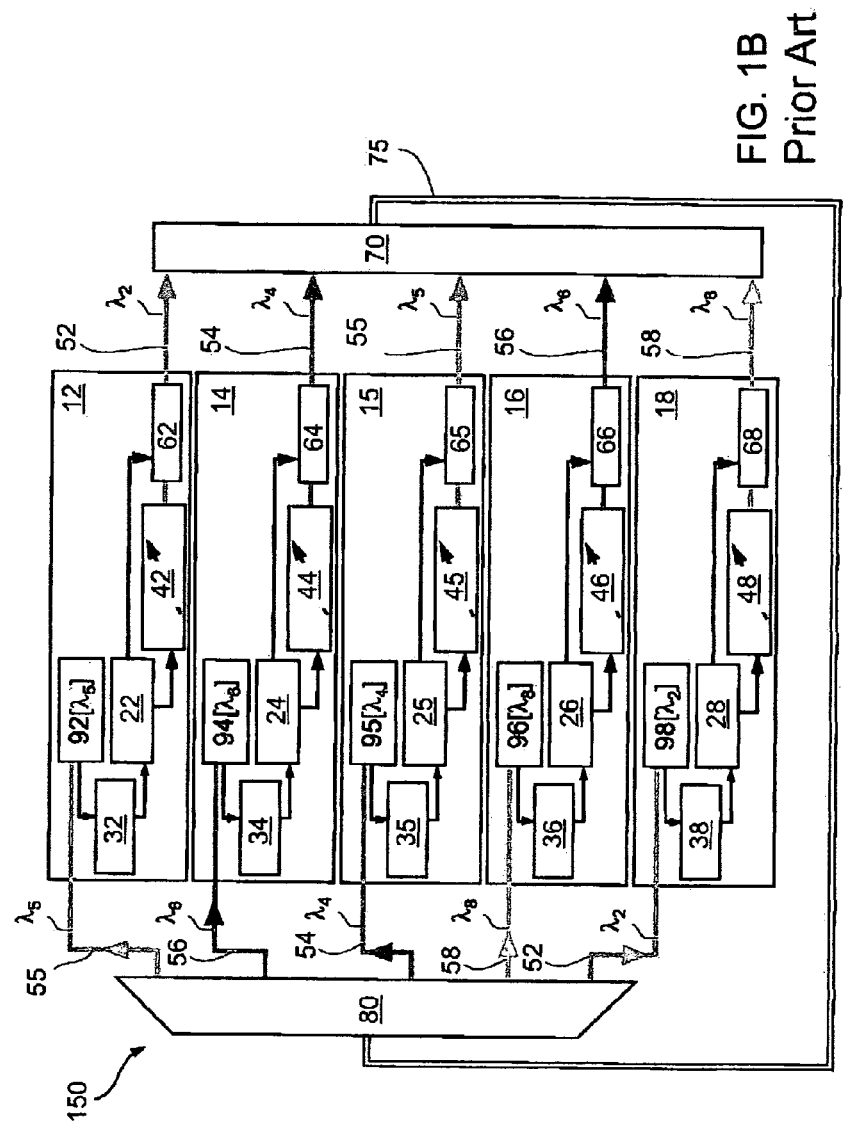

The basic building block of the electroholographic device is the electrically controlled Bragg grating (ECBG) as presented schematically in FIGS. 1B and 1C. When the electric field is off the grating is in a latent state. In this state (FIG. 1B), the grating is transparent so that an incident light wave propagates through the grating unaffected. When the electric field is turned on (FIG. 1C), the grating is activated. In the 'on' (active) state an input beam will be diffracted, provided it fulfills Bragg condition, as shown for the beam of wavelength $\lambda_1$ in FIG. 1C. An input beam that does not fulfill Bragg condition will propagate through the active grating unaffected, as shown for the beam of wavelength $\lambda_2$ in FIG. 1C. Thus, an electrically controlled grating possesses the basic feature for functioning as a wavelength selective switch.

Electroholography is based on the voltage controlled photorefractive effect at the paraelectric phase. The ECBG is a space charge Bragg grating or a volume hologram stored in a volume of a paraelectric crystal by the photorefractive process. Since the electrooptic effect at the paraelectric phase is quadratic, the application of a uniform electric field on the crystal causes the refractive index (birefringence) grating induced by the space charge grating to be directly proportional the applied field. Thus, the switching operation involves the activation of an index grating that is stored in a latent form as a space charge grating. An alternative electroholographic switching mechanism is by use of the dielectric photorefractive effect where the latent grating is stored in the form of a dielectric constant grating. Here the application of a uniform electric field induces a (low frequency) polarization grating that couples with the uniform polarization induced by the field to form the index grating.

In principle, the electroholographic switches described in U.S. Pat. No. 6,542,264, to Agranat, et al., dated Apr. 1, 2003, whose disclosure is incorporated herein by reference, are suitable as the optical switches of FIGS. 2A-6. However, these switches are tailored for circuit switching applications in telecomm networks, and may not be optimal for the present application.

An alternative is a new electroholographic switch tailored for the laser power grid, described in M. Balberg, M. Razvag, E. Refaelli, and A. J. Agranat, "Electric field multiplexing of volume holograms in paraelectric crystals" Applied Optics 37, pp. 841-847 (1998)), whose disclosure is incorporated herein by reference. It is based on the principle of electric field multiplexing.

Electric field multiplexing (EFM) of volume gratings enables to selectively restore a single grating from an ensemble of gratings that are superimposed in the same volume. Selective restoration is accomplished by applying an electric field at a level that tunes the Bragg condition of the selected wavelength. EFM is less suitable for wavelength-selective data switching, as in U.S. Pat. No. 6,542,264, because only a fraction of the beam of the selected wavelength is deflected, rendering this wavelength unusable further along the network.

However, in the laser power grid, at each PE, the power distributor transfers a fraction of the power at the selected wavelength to the data network. The remaining power at the selected wavelength continues in the power grid. Hence, EFM can be used as the wavelength selection method with laser power grid 100, as has been described in conjunction with FIGS. 6A-6B.

It will be appreciated that electroholography may be achieved by Bragg's detuning, for example as taught in U.S. Pat. No. 5,684,612 to Wilde et al., dated Nov. 4, 1997, whose disclosure is incorporated herein by reference. Wilde et al., teach a hologram with a dynamically controlled diffraction efficiency and enhanced signal-to-noise ratio, recorded in ferroelectric photorefractive materials, such as strontium barium niobate ($Sr_x Ba_{1-x} Nb_2 O_6$) (SBN), BSTN, SCNN, PBN, BSKNN, $BaTiO_3$, $LiNbO_3$, $KNbO_3$, KTN, PLZT and the tungsten bronze family. The diffraction efficiency of the hologram is dynamically controlled by applying an electric field along the polar axis of the ferroelectric photorefractive recording medium. Electrically controlled diffraction is used in conjunction with hologram fixing and operation of the material at a temperature in the vicinity of or above its Curie temperature to additionally provide prolonged, low-noise readout. The general methods for recording and reconstructing a hologram (or a set of multiplexed holograms) using these techniques is disclosed. A plurality of configurations employing the improved hologram are disclosed, including an optical crossbar switch in guided-wave and free-space formats that can function as a component in a variety of parallel optical processing systems, a reconfigurable dynamic wavelength filter, and a page-based holographic data storage system. However, the system of Wilde et al., which is based on Bragg's detuning, applies only to the embodiment of FIGS. 2A and 2B, hereinbelow, where each optical switch is controlled individually.

Alternatively, the electroholographic switches may operate by Bragg's detuning, wherein the holograms are operative at no electric field and are detuned by the application of an external electric field; the application of an electric field is the "off" mode, and no light is deflected. With the removal of the electric field, all the holograms are tuned, and all the light propagations may deflect, simultaneously. This method may be applied for the plurality of switches shown in FIGS. 2A and 2B, or to the single switch containing multiple holograms, shown in FIG. 2C.

Electroholography combines several unique features. The basic electroholographic switching operation is the reconstruction of a volume grating (hologram), that requires that the Bragg condition be satisfied, and therefore it is wavelength selective. In addition the applied field governs the efficiency of the reconstruction. Consequently electroholography includes grouping, multicasting, laser power management and non-intrusive data monitoring as an integral part of the switching operation. Since the electrooptic effect is polarization dependent the switching operation is a priori not PDL free. However, by including diversity in the architecture of the device the dependence of the switching efficiency on the polarization of the light can be removed.

The performance envelope of the basic electroholographic device is determined by the physical dimensions of the implemented grating and input beam.

The switch is inherently independent of the data throughput rate. BER in a switch operating at 40 Gb/s where measured to be $10^{-13}$. In a device that is a cube of $1.8^3$ $mm^3$ the minimum net insertion loss is 0.5 dB per switching operation. The minimum loss when a beam propagates through a latent grating is 0.2% primarily due to losses by the antireflective coating at the faces of the crystal. The PDL in a device that includes diversity architecture is less than 0.2 dB and the PMD is less than 0.05 ps. Finally, the temporal behavior of the switch is determined by the dielectric response of the crystal at the operating temperature. Response time of less than 10 ns was measured in an electroholographic switch. The basics of electroholography as a well as a detailed discussion of the various functions and reliability issues are given in detail in A. J. Agranat, "Optical Lambda-Switching at Telecom Wavelengths Based on Electroholography", in: IR Holography for Optical Communications—Techniques, Materials and Devices, Pierpaolo Boffi, Davide Piccinin, Maria Chiara Ubaldi (Eds.), (Springer Verlag series on Topics in Applied Physics 2002).

It will be appreciated that power losses may take place along laser power grid 100, and it may be necessary to supply additional power to compensate for the loss along the grid and in its components.

It is expected that during the life of this patent many relevant laser power grids will be developed and the scope of the present invention is intended to include all such new technologies a priori.

As used herein the term "about" refers to ±10%.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference.

What is claimed is:

1. A laser power grid, comprising:
  a plurality of continuous-work (cw) laser sources, for generating a plurality of light propagations, such that each of said light propagations is distinct by its wavelength;
  a laser distribution grid comprising at least one optical fiber optically coupled to said plurality of light propagations, for transmitting said plurality of light propagations to an input signal;
  a network of processing elements (PEs), each addressable by a corresponding distinct wavelength, and a plurality of optical-switch arrays of a number corresponding to a number of PEs, each of said optical-switch arrays serving a respective one of the PEs and comprising a number of optical switches corresponding to a number of said light propagations, the optical switches being coupled to said laser distribution grid and adapted for deflecting a predetermined portion of a single one of said light propagations, distinct by its wavelength, responsive to an input signal so that another PE served by another of said plurality of optical-switch arrays is designated, to thereby enable a wavelength addressing in which every PE in the network is assigned to a wavelength, as a receiving address, said input signal specifying which one of said light propagations, distinct by its wavelength, is desired, at each of said optical-switch arrays, wherein each of said optical-switch arrays is adapted to deflect light propagations of different wavelengths, responsive to different input signals, and wherein, the remainder portion of said single one of said light propagations and the remainder of said plurality of light propagations continue to propagate through said laser distribution grid, to the other ones of said plurality of optical-switch arrays, where predetermined portions of other light propagations, distinct by their wavelength, are deflected, responsive to other input signals.

2. The laser power grid of claim 1, wherein said laser distribution grid is formed as a plurality of optical fibers.

3. The laser power grid of claim 1, wherein said laser distribution grid is formed as a multi-mode fiber.

4. The laser power grid of claim 1, wherein said laser distribution grid is formed as a single-mode fiber.

5. The laser power grid of claim 1, wherein said at least one optical switch is an electroholographic switch.

6. The laser power grid of claim 5, wherein said at least one optical switch is operative by electric field multiplexing (EFM).

7. The laser power grid of claim 1, wherein said a laser distribution grid is formed as one optical fiber, which is coupled to said plurality of optical switches, with an optical wavelength demultiplexer upstream of said optical-switch array and an optical coupler downstream of said optical-switch array.

8. The laser power grid of claim 7, comprising an optical coupler for coupling optical fibers along the deflected course of the light propagation.

9. The laser power grid of claim 1, wherein said each optical switch is adapted to deflect a predetermined portion of said single light propagation of said distinct wavelength.

10. The laser power grid of claim 1, wherein said laser sources are fixed-wavelength laser sources.

11. The laser power grid of claim 1, wherein said laser sources are tunable laser sources.

12. The laser power grid of claim 1, wherein each of said optical-switch arrays serving a PE is configured to directly address every PE coupled to said laser distribution grid.

13. The laser power grid of claim 1, wherein each of said optical-switch arrays serving a PE is configured to send data simultaneously to another PE coupled to said laser distribution grid via plurality of light propagations.

14. A data network, comprising:
a laser power grid, which comprises:
a plurality of continuous-work (cw) laser sources, for generating a plurality of light propagations, such that each of said light propagations is distinct by its wavelength;
a laser distribution grid comprising at least one optical fiber optically coupled to said plurality of light propagations, for transmitting said plurality of light propagations; to an input signal;
a plurality of processing element (PE), each addressable by a corresponding distinct wavelength, each electronically coupled to one of said plurality of optical-switch arrays, for providing said input signal, for deflecting said single one of said plurality of light propagations of said distinct wavelength;
a plurality of optical-switch arrays, each of said optical-switch arrays serving a respective one of the PEs of a number corresponding to a number of PEs and comprising a number of optical switches corresponding to a number of said light propagations, the optical switches being coupled to said laser distribution grid, and adapted for deflecting a predetermined portion of a single one of said light propagations, distinct by its wavelength, responsive to an input signal so that another PE served by another of said plurality of optical-switch arrays is designated to thereby enable a wavelength addressing in which every PE in the network is assigned to a wavelength, as a receiving address;
a plurality of optical modulators, each electronically coupled to one of said plurality of PEs and optically coupled to said one of said optical-switch arrays, associated with said PE, for modulating said single light propagation of said distinct wavelength, responsive to an electronic information of said PE, for forming an optical data packet of a distinct wavelength for transmission to a PE configured to receive said distinct wavelength.

15. The data network of claim 14, adapted for single-wavelength data transmission.

16. The data network of claim 14, comprising an optical coupler, for receiving data packets from said modulators and for coupling said data packets to an optical fiber, for wavelength division multiplexing (WDM).

17. The data network of claim 16, wherein said WDM is a coarse wavelength division multiplexing (CWDM).

18. The data network of claim 16, wherein said WDM is a dense wavelength division multiplexing (DWDM).

19. The data network of claim 16, comprising a demultiplexer, optically coupled to said optical fiber for decoupling said data packets, in accordance with their wavelengths.

20. The data network of claim 19, wherein said wavelength addressing provides that each of said optical data packets is routed to a receiving PE, as determined by said distinct wavelength of said optical data packet.

21. The data network of claim 20, wherein any one of said plurality of PEs may be assigned a wavelength address and may act as said receiving PE.

22. The data network of claim 21, wherein the number of said plurality of PEs is less than or equal to the number of said plurality of cw laser sources, and each of said plurality of PEs is assigned a wavelength address.

23. The data network of claim 14, wherein said plurality of PEs is arranged in a U plurality of clusters, for a multi-cluster design, said data network further comprises: a plurality of routing switches, each electronically coupled to one of said plurality of PEs, for receiving an input signal therefrom, and each optically coupled to an output of one of said plurality of optical modulators, for routing data packets issuing from said optical modulators to a $U^2$ plurality of output optical couplers, responsive to said input signals from said plurality of PEs, each of said $U^2$ plurality of output optical couplers being designated by an output cluster and an input cluster; and a U plurality of input optical couplers, for coupling data packets arriving in said $U^2$ plurality of output optical couplers to a U plurality of optical fibers, each designated by an input cluster.

24. The data network of claim 23, further comprising a U plurality of demultiplexers, each optically coupled to one of said U plurality of optical fibers, for decoupling said data packets, in accordance with their wavelengths.

25. The data network of claim 23, wherein said U plurality of clusters includes at least one of input clusters and output clusters distributed among different locations.

26. The data network of claim 14, wherein said plurality of PEs is distributed among a Q plurality of locations, and said data network further comprises: a Q plurality of output optical couplers, for coupling a plurality of data packets to be transmitted from each location to a Q plurality of output optical fibers;
a central optical coupler, for coupling said Q plurality of output optical fibers to a single, central fiber; a demultiplexer, optically coupled to said single, central fiber, for decoupling said data packets, in accordance with their wavelengths.

27. The data network of claim 26, further comprising a Q plurality of input optical couplers, for coupling a plurality of data packets heading to said Q plurality of locations, into a Q plurality of input optical fibers, each leading to one location, the coupling being based on wavelength addresses of PEs in each location.

28. The data network of claim 27, further comprising a Q plurality of input demultiplexers, each optically coupled to one of said input optical fibers, for decoupling said data packets, in accordance with their wavelengths.

29. The data network of claim 14, wherein said laser distribution grid is formed as a plurality of optical fibers.

30. The data network of claim 14, wherein said laser distribution grid is formed as a multi-mode fiber.

31. The data network of claim 14, wherein said laser distribution grid is formed as a single-mode fiber.

32. The laser power grid of claim 14, wherein said at least one optical switch is an electroholographic switch.

33. The laser power grid of claim 32, wherein said at least one optical switch is operative by electric field multiplexing (EFM).

34. The laser power grid of claim 14, wherein at least one of said plurality of optical-switch arrays includes a plurality of optical switches, equal to said plurality of light propagations, each optical switch being optically coupled to said laser distribution grid, and each optical switch being adapted for deflecting a single one of said light propagations of said distinct wavelength, responsive to said input signal.

35. The laser power grid of claim 34, wherein said a laser distribution grid is formed as one optical fiber, which is coupled to said plurality of optical switches, with an optical wavelength demultiplexer upstream of said optical-switch array and an optical coupler downstream of said optical-switch array.

36. The laser power grid of claim 35, comprising an optical coupler for coupling optical fibers along the deflected course of the light propagation.

37. The data network of claim 14, wherein said each optical switch is adapted to deflect a predetermined portion of said single light propagation of said distinct wavelength.

38. The laser power grid of claim 14, wherein said laser sources are fixed-wavelength laser sources.

39. The data network of claim 14, wherein said laser sources are tunable laser sources.

40. A method of data transmitting, comprising:
providing a laser power grid, which comprises:
a plurality of continuous-work (cw) laser sources, for generating a plurality of light propagations, such that each of said light propagations is distinct by its wavelength;
a laser distribution grid comprising at least one optical fiber optically coupled to said plurality of light propagations, for transmitting said plurality of light propagations; to an input signal;
a plurality of processing element (PE), each addressable by a corresponding distinct wavelength, each electronically coupled to one of said plurality of optical-switch arrays, for providing said input signal, for deflecting said single one of said plurality of light propagations of said distinct wavelength;
a plurality of optical-switch arrays, each of said optical-switch arrays serving a respective one of the PEs of a number corresponding to a number of PEs and comprising a number of optical switches corresponding to a number of said light propagations, the optical switches being coupled to said laser distribution grid, and adapted for deflecting a predetermined portion of a single one of said light propagations, distinct by its wavelength, responsive to an input signal so that another PE served by another of said plurality of optical-switch arrays is designated to thereby enable a wavelength addressing in which every PE in the network is assigned to a wavelength, as a receiving address;
electronically coupling said plurality of PEs to said plurality of optical-switch arrays, each PE being adapted to provide said input signal, for deflecting said single light propagation of said distinct wavelength, associated with said each PE; and
modulating said single light propagation of said distinct wavelength, responsive to an electronic information of said each PE, for forming an optical data packet of a distinct wavelength for transmission to the PE configured to receive said distinct wavelength.

41. A laser power grid, comprising:
a plurality of continuous-work (cw) laser sources, for generating a first plurality of light propagations, such that each of said first light propagations is distinct by its wavelength;
a laser distribution grid comprising at least one optical fiber optically coupled to said plurality of light propagations, for transmitting said first plurality of light propagations; to an input signal;
a plurality of processing element (PE), each addressable by a corresponding distinct wavelength, each electronically coupled to one of said plurality of optical-switch arrays, for providing said input signal, for deflecting said single one of said plurality of light propagations of said distinct wavelength;
a plurality of optical-switch arrays, each of said optical-switch arrays serving a respective one of the PEs of a number corresponding to a number of PEs and comprising a number of optical switches corresponding to a number of said light propagations, the optical switches being coupled to said laser distribution grid, and each of said optical-switch arrays being adapted for deflecting predetermined portions of a second plurality of light propagations, simultaneously, responsive to an input signal so that another PE served by another of said plurality of optical-switch arrays is designated,
wherein said second plurality of light propagations is not greater than said first plurality of light propagations,
and wherein, the remainder portions of said second plurality of light propagations and the remainder of said first plurality of light propagations continue to propagate through said laser distribution grid, to the other ones of said plurality of optical-switch arrays, where predetermined portions of other light propagations, distinct by their wavelength, are deflected, responsive to other input signals.

* * * * *